United States Patent
Ozaki et al.

(10) Patent No.: US 7,424,357 B2
(45) Date of Patent: Sep. 9, 2008

(54) LANE DEPARTURE PREVENTION APPARATUS

(75) Inventors: Masahiro Ozaki, Yokohama (JP); On Sadano, Atsugi (JP); Takashi Sugano, Kawasaki (JP); Yoshitaka Uemura, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 744 days.

(21) Appl. No.: 10/883,782

(22) Filed: Jul. 6, 2004

(65) Prior Publication Data
US 2008/0172153 A1 Jul. 17, 2008

(30) Foreign Application Priority Data

| Jul. 7, 2003 | (JP) | ............................. 2003-193013 |
| Sep. 26, 2003 | (JP) | ............................. 2003-335754 |
| Nov. 20, 2003 | (JP) | ............................. 2003-390505 |

(51) Int. Cl.
G06F 7/70 (2006.01)

(52) U.S. Cl. ..................... 701/70; 701/300; 701/301; 340/903; 342/70; 342/71

(58) Field of Classification Search .................. 701/70, 701/96, 300, 301, 23, 26, 86, 210, 211, 213; 340/436, 903; 303/9, 121, 125, 132, 146, 303/154, 168, 167; 342/70, 71
See application file for complete search history.

(56) References Cited

U.S. PATENT DOCUMENTS

| 6,282,478 | B1 * | 8/2001 | Akita ........................... 701/70 |
| 2002/0087255 | A1 | 7/2002 | Jindo et al. | |
| 2003/0120414 | A1 | 6/2003 | Matsumoto et al. | |

FOREIGN PATENT DOCUMENTS

| JP | 7-14100 A | 1/1995 |
| JP | 2000-33860 A | 2/2000 |

* cited by examiner

*Primary Examiner*—Khoi H. tran
*Assistant Examiner*—Marie A Weiskopf
(74) *Attorney, Agent, or Firm*—Global IP Counselors, LLP

(57) ABSTRACT

A lane departure prevention apparatus is configured for reducing risk of a vehicle while preventing lane departure. The lane departure prevention apparatus basically comprises a lane departure tendency determining section, a running condition determining section and a braking force control section. The lane departure tendency determining section determines a lane departure tendency of the host vehicle from a driving lane. The running condition determining section determines a running condition of the host vehicle. The braking force control section controls a braking force to selectively produce at least one of a yaw moment on the host vehicle in accordance with the lane departure tendency of the host vehicle to avoid departure of the host vehicle from the driving lane, and a deceleration on the host vehicle in accordance with the running condition of the host vehicle.

27 Claims, 18 Drawing Sheets

LANE DEPARTURE PREVENTION APPARATUS

BACKGROUND OF THE INVENTION

1. Field of the Invention

The present invention generally relates to a lane departure prevention apparatus for preventing a host vehicle from departing from a driving lane when the host vehicle is about to depart from the lane.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving lane by providing this yaw moment in cases in which there is a possibility that the host vehicle may depart from a driving lane. For example, one such lane departure prevention apparatus is disclosed in Japanese Laid-Open Patent Publication No. 2000-33860.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

It has been discovered that in the above mentioned lane departure prevention apparatus, for example, a lateral shift detector detects the lateral shift of the host vehicle driving position from a driving lane reference position, and braking force is imparted based on the detected lateral shift thereof. The yaw moment is thereby provided to the host vehicle and the host vehicle is prevented from deviating from the driving lane.

Thus, in the above mentioned lane departure prevention apparatus, control for lane departure prevention is performed while taking solely the positional relationship of the host vehicle and the driving lane into consideration. However, depending on the driving state of the host vehicle, there are cases in which vehicle behavior becomes unstable because control for lane departure prevention has been actuated. In this case, the driver is caused discomfort.

For this reason, considering the case in which a host vehicle has temporarily departed from the driving lane in a state in which yaw moment has been provided to the host vehicle, the driver is caused discomfort if the departure destination is the road shoulder or another area outside a driving lane. Conversely, if control to prevent departure is performed early in order to inhibit this discomfort, the same early control as that when the destination of the departure is the road shoulder or another area outside the driving lane is performed even when departure occurs from the driving lane to the passing lane on a two-lane road with a driving lane and a passing lane, and departure prevention control is performed in spite of the fact that the driver does not feel significant discomfort, causing the driver to feel that excessive control is performed and creating the danger that feelings of annoyance will be created.

In view of the above, the present invention was contrived while taking into consideration the problems described above. One object of the present invention is to provide a lane departure prevention apparatus with which the driver rarely feels annoyance, by changing the content of lane departure prevention in accordance with the lane in which the host vehicle is currently traveling and other driving environments. Another object of the present invention is to provide a lane departure prevention apparatus that is capable of preventing lane departure without making the host vehicle behavior unstable.

To achieve the forgoing objects and overcome some of the foregoing problems, a lane departure prevention apparatus is provided that basically comprises a lane departure tendency determining section, a running condition determining section and a braking force control section. The lane departure tendency determining section is configured to determine a lane departure tendency of the host vehicle from a driving lane. The running condition determining section is configured to determine a running condition of the host vehicle. The braking force control section is configured to control a braking force in response to determinations by the lane departure tendency determining section and the running condition determining section to selectively produce at least one of a yaw moment on the host vehicle in accordance with the lane departure tendency of the host vehicle to avoid departure of the host vehicle from the driving lane, and a deceleration on the host vehicle in accordance with the running condition of the host vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
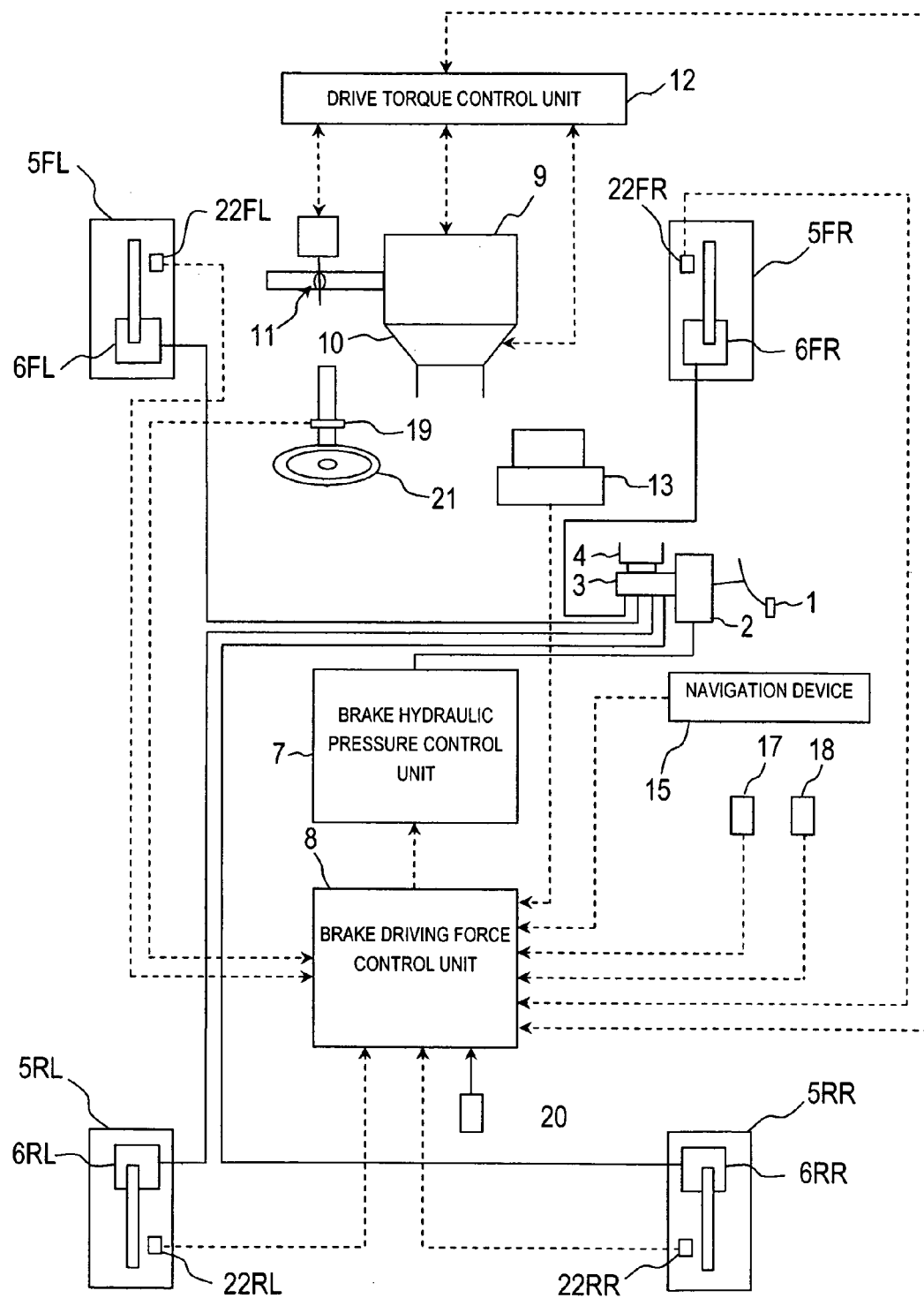
FIG. 1 is a schematic structural diagram of a vehicle equipped with a lane departure prevention apparatus in accordance a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The illustrated embodiments show a rear wheel drive vehicle equipped with the lane departure prevention apparatus of the present invention. Of course, the lane departure prevention apparatus of the present invention can be applied to a front wheel drive vehicle. In either case, basically, the lane departure prevention apparatus of the present invention is configured for reducing risk of a vehicle while preventing lane departure. Moreover, the lane departure prevention apparatus of the present invention is configured to prevent lane departure without disrupting vehicle behavior. As explained below, the present invention ensures that vehicle behavior is stable and that lane departure is prevented.

According to the present invention as explained below, the lane departure prevention control basically entails determining a lane departure tendency of the host vehicle from a driving lane and a running condition (e.g., a host vehicle driving environment or a host vehicle velocity) of the host vehicle, and then selectively controlling a braking force of one or more wheels based on the determinations of the lane departure tendency and the running condition to selectively produce at least one of a yaw moment on the host vehicle in accordance with the lane departure tendency of the host vehicle to avoid departure of the host vehicle from the driving lane, and a deceleration on the host vehicle in accordance with the running condition of the host vehicle. Thus, the lane departure prevention apparatus of the present invention is basically configured such that the braking forces to the wheels are adjusted, such that the yaw moment imparted to a host vehicle and the deceleration of the host vehicle are apportioned to avoid departure of the host vehicle from a driving lane. Preferably, the yaw moment is decided in accordance with a lane departure tendency.

In a preferred embodiment, explained below, the lane departure prevention apparatus of the present invention is configured to calculate the target yaw moment and the deceleration control amount, and imparting a braking force to each wheel on the basis of the target yaw moment and the deceleration control amount. Thus, if the departure destination of the host vehicle is a road shoulder or another area outside a driving lane, then the driver can be prevented from feeling discomfort by increasing the setting for the deceleration contribution instead of performing early departure prevention control. Conversely, when host vehicle departure occurs from the driving lane to the passing lane on a two-lane road with a driving lane and a passing lane, early departure prevention control is eliminated, so the driver can be prevented from being made to feel that excessive control is performed and being made to feel annoyance.

There are cases in which the host vehicle behavior of the host vehicle becomes unstable if yaw moment is imparted with the aim of preventing lane departure when the host vehicle velocity is considerable. When the lane departure tendency is considerable, there are cases in which the host vehicle behavior of the host vehicle becomes unstable if yaw moment is imparted with the aim of preventing lane departure in accordance with the departure tendency. In this case, the driver may be caused discomfort. Because of this, when the host vehicle velocity or the lane departure tendency is considerable, deceleration is performed with priority over imparting yaw control as means for controlling lane departure prevention in cases in which control for preventing lane departure is required.

First Embodiment

Referring initially to FIG. 1, a schematic structural diagram of a host vehicle is illustrated that is equipped with a lane departure prevention apparatus in accordance with a first embodiment of the present invention. In the diagram, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a brake driving force control unit 8, an engine 9, an automatic transmission 10, a throttle valve 11, a drive torque control unit 12, an imaging unit 13, a navigation device 15, a master cylinder pressure sensor 17, an throttle aperture sensor 18, a steering angle sensor 19, a turn signal switch 20, a steering wheel 21, a pair of front wheel velocity sensors 22FL to 22FR and a pair of rear wheel velocity sensors 22RL to 22RR.

The wheel cylinders 6FL to 6RR, the brake hydraulic pressure control unit 7, the brake driving force control unit 8 all form part of a braking apparatus that allows independent control of braking force for the front and rear wheels and the left and right wheels. The brake hydraulic pressure is boosted by the master cylinder 3 such that the brake fluid is ordinarily fed to the wheel cylinders 6FL to 6RR of the wheels 5FL to 5RR in accordance with the downward force exerted by the driver on the brake pedal 1. Also, the brake hydraulic pressure control unit 7 is interposed between the master cylinder 3 and the wheel cylinders 6FL to 6RR for allowing the brake hydraulic pressure of the wheel cylinders 6FL to 6RR to be individually controlled by the brake hydraulic pressure control unit 7.

The brake hydraulic pressure control unit 7 is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the brake driving force control unit 8.

The drive torque control unit 12 controls the drive torque to the rear wheels 5RL and 5RR, which are the drive wheels, by controlling the size of the throttle aperture of the throttle valve 11 and by the selecting a gear ratio of the automatic transmission 10 when the engine 9 is in an operating condition. The drive torque control unit 12 controls the fuel injection amount and the ignition timing, and controls the operating condition of the engine 9 by simultaneously controlling the size of the throttle aperture. With this drive torque control unit 12, the value of the drive torque Tw that is used for control is output to the brake driving force control unit 8.

The drive torque control unit 12 is also configured to independently control the drive torque of the rear wheels 5RL and 5RR. Thus, the drive torque control unit 12 is also configured to control the drive wheel torque in accordance with a drive torque command value when the drive torque command value is input from the brake driving force control unit 8.

The imaging unit 13 has a picture processing function. The imaging unit 13 is designed to detect the position of the host vehicle in the driving lane in order to detect the lane departure tendency of the host vehicle. The imaging unit 13 is configured to pick up an image with a monocular camera composed of a CCD (Charge Coupled Device) camera. The imaging unit 13 is preferably disposed on the front of the host vehicle.

The imaging unit 13 is preferably configured and arranged to detect white lines or other lane markers, for example, from the imaging picture of the area in front of the host vehicle. Thus, the driving lane is detected based on the detected lane markers. Furthermore, the imaging unit 13 calculates the angle (yaw angle) $\phi$ formed by the driving lane of the host vehicle and the longitudinal axis of the host vehicle, the lateral displacement X from the center of the driving lane, the driving lane curvature $\beta$, and the like based on the detected driving lane. The imaging unit 13 outputs the calculated yaw angle $\phi$, the calculated lateral displacement X, the calculated driving lane curvature $\beta$, and the like to the brake driving force control unit 8.

The navigation device 15 is preferably configured and arranged to detect the yaw rate $\phi'$ and the longitudinal acceleration Xg and/or the lateral acceleration Yg generated in the host vehicle. The navigation device 15 outputs the detected longitudinal acceleration Xg, the detected lateral acceleration Yg, and the detected yaw rate $\phi'$ to the brake driving force control unit 8. The navigation device 15 also outputs road information to the brake driving force control unit 8. Preferably, the road information (i.e., host vehicle driving environment) includes information about the type of the road, such as the number of lanes and whether the road is an ordinary road or an expressway.

The master cylinder pressure sensor 17 is preferably configured and arranged to detect the output pressure of the master cylinder 3, that is, the master cylinder hydraulic pressures Pmf and Pmr. The throttle aperture sensor 18 is preferably configured and arranged to detect the downward force on the accelerator pedal, that is, the aperture size $\theta t$. The steering angle sensor 19 is preferably configured and arranged to detect the steering angle $\delta$ of the steering wheel 21. The wheel velocity sensors 22FL to 22RR are preferably configured and arranged to detect the rotational velocity of the wheels 5FL to 5RR, that is, the so-called wheel velocity Vwi (i=fl, fr, rl, rr). The turn signal switch 20 is preferably configured and arranged to detect turn signal operation with a turn signal indicator. All of these detection signals detected by these sensors or the like are output to the brake driving force control unit 8.

When there is left or right directionality in the detected driving condition data of the host vehicle, the two directions are set such that the left direction is the positive direction. In other words, the yaw rate $\phi'$, the lateral acceleration Yg, and the yaw angle $\phi$ are positive values when turning left, and the lateral displacement X is a positive value when shifting from the center of the driving lane to the left.

Next, a computational processing procedure carried out in the brake driving force control unit 8 is described below with reference to FIG. 2. The computational processing is executed by using a timer interrupt at each predetermined sampling time $\Delta T$, such as every 10 msec, for example. Communication processing is not included in the processing shown in FIG. 2, but the information obtained by the computational processing is updated and stored in random access memory, and required information is read from the random access memory.

First, in step S1, various data is read from the above-described sensors, by the brake driving force control unit 8. More specifically, the following types of data are read: the longitudinal acceleration Xg, the lateral acceleration Yg, the yaw rate $\phi'$, and the road information obtained by the navigation device 15; the wheel velocity Vwi, the steering angle $\delta$, the throttle aperture $\theta t$, the master cylinder hydraulic pressures Pmf and Pmr, and the turn switch signal from the various sensors; the drive torque Tw from the drive torque control unit 12; and the yaw angle $\phi$, the lateral displacement X, and the driving lane curvature $\beta$ from the imaging unit 13.

The host vehicle velocity V is calculated in the subsequent step S2. More specifically, the host vehicle velocity V is calculated using Equation (1) as shown below, based on the wheel velocity Vwi read in the above-described step S1.

$V=(Vwrl+Vwrr)/2$ for front wheel drive, and $V=(Vwfl+Vwfr)/2$ for rear wheel drive  (1)

In the Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 5FL and 5FR.

Also, the host vehicle velocity V calculated in this manner is preferably used during normal driving. In other words, when the ABS (Anti-lock Brake System) control or the like is operating, for example, the estimated car body velocity that is estimated in the ABS control is used as the above-described vehicle velocity V. The value being used for the navigation information in the navigation device 15 can also be used as the above-described vehicle velocity V.

Figure 3:
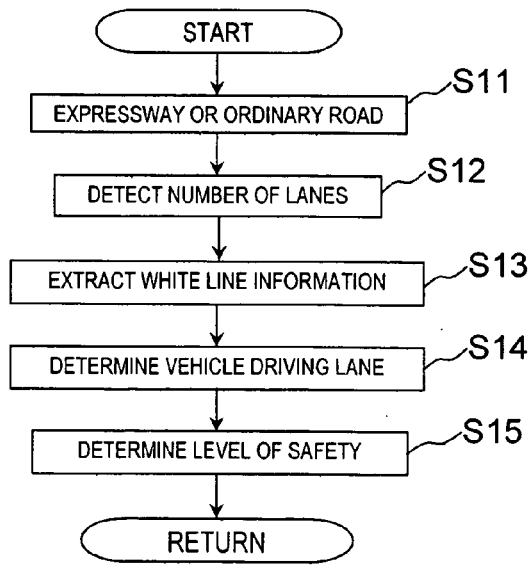
FIG. 3 is a flowchart showing the processing content for determining the driving environment by the brake driving force control unit.

The host vehicle driving environment (i.e., a host vehicle running condition) is determined in the following step S3. More specifically, the type of road on which the host vehicle is traveling and the driving lane of the host vehicle are detected as driving environment. The direction based on the level of risk is then determined from the detected results. The determination is made based on the video information from the imaging unit 13 and on the road information from the navigation device 15. In other words, the determination of the driving environment is made based on the number of lanes and the road-type information that indicates whether the road is an ordinary road or an expressway. FIG. 3 shows the specific processing procedure for determining the driving environment.

First, in step S11, the type of road (ordinary road or expressway) currently being traveled is acquired from the road information provided by the navigation device 15. Furthermore, in step S12, the number of lanes of the road currently being traveled is acquired from the road information provided by the navigation device 15.

Figure 4:
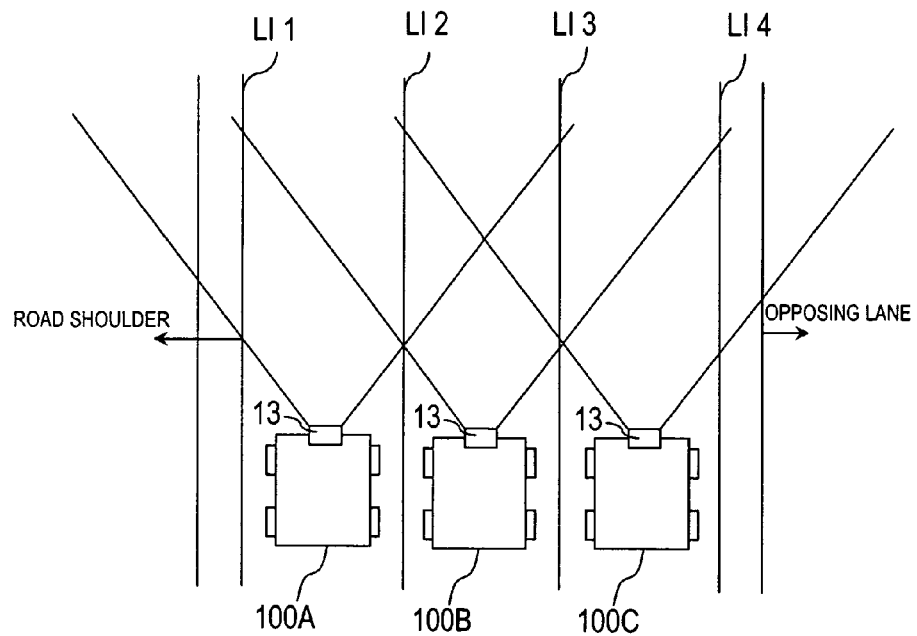
FIG. 4 is a diagram showing vehicles traveling on three-lane, one-way road.

In the subsequent step S13, the white line portion (lane-dividing line portion) is extracted from the imaging picture taken by the imaging unit 13. Here, an example is described for the case in which the host vehicle is traveling along a three-lane, one-way road, as shown in FIG. 4. The road, by being partitioned from the left-hand side by first to fourth white lines LI1, LI2, LI3, and LI4, is configured as a three-lane, one-way road, as shown in FIG. 4. When the host vehicle is traveling along such a road, the imaging picture obtained for each lane is different. Furthermore, a picture composed of white lines extracted from the picture also differs in accordance with the driving lane.

Figure 5:
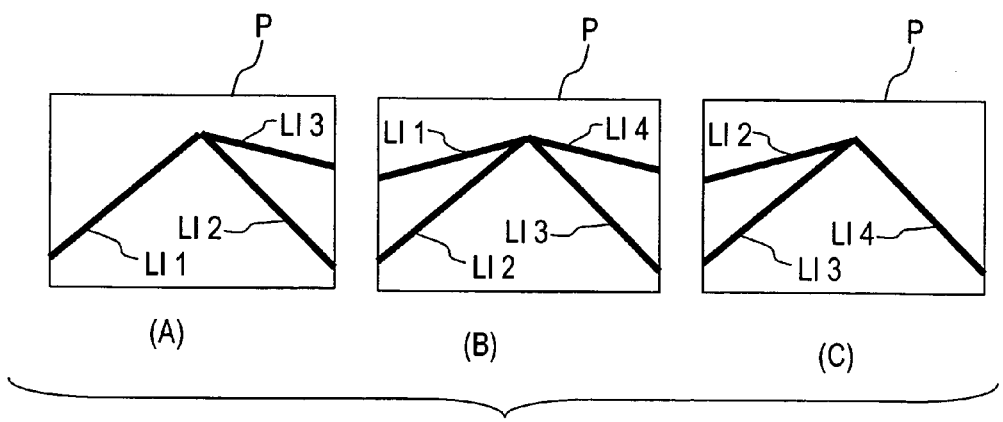
FIG. 5 is a diagram showing the imaging picture taken by the host vehicle in each lane position when the host vehicle is traveling on the three-lane, one-way road.

In other words, when the host vehicle 100A is traveling in the left-hand lane in the traveling direction, the imaging picture P taken by the imaging unit 13 of the host vehicle 100A is a unique picture mainly comprising first, second, and third white lines LI1, LI2, and LI3, as shown in picture (A) of FIG. 5. Also, when the host vehicle 100B is traveling in the center lane, the imaging picture P taken by the imaging unit 13 of the host vehicle 100B is a unique picture mainly comprising first, second, third, and fourth white lines LI1, LI2, LI3, and LI4, as shown in picture (B) of FIG. 5. When the host vehicle 100C is traveling in the right-hand lane in the traveling direction, the imaging picture P taken by the imaging unit 13 of the host vehicle 100C is a unique picture mainly comprising second, third, and fourth white lines LI2, LI3, and LI4, as shown in picture (C) of FIG. 5. Thus, the configuration of the white lines in the picture differs in accordance with the driving lane.

The host vehicle driving lane is determined in the subsequent step S14. More specifically, the host vehicle driving lane is determined based on the information obtained in steps S12 and S13. In other words, the host vehicle driving lane is determined based on the number of lanes in the road currently being traveled by the host vehicle and the imaging picture (picture with the white lines extracted) taken by the imaging unit 13. For example, the picture obtained in accordance with the number of lanes and the driving lane is stored in advance as picture data, the picture data prepared in advance is compared with the number of lanes in the road currently being traveled by the host vehicle and the current imaging picture (picture with the white lines extracted) taken by the imaging unit 13, and the host vehicle driving lane is determined.

The level of risk in the transverse direction viewed from the lane in which the host vehicle is driving is determined in the subsequent step S15. More specifically, the direction in which the level of risk is high is stored as information when the host vehicle has departed from the lane. Therefore, when the level of risk is high in the left-hand direction, as viewed from lane in which the host vehicle is traveling, this direction is stored as the direction (hereinafter referred to as "the first obstacle-containing direction") Sout in which the level of risk is high (Sout=left). When the level of risk is high in the right-hand direction, as viewed from lane in which the host vehicle is traveling, this direction is stored as the first obstacle-containing direction Sout (Sout=right). This is determined as follows, for example.

In FIG. 4, for example, when the host vehicle 100A is traveling in the left-hand lane, the level of risk is higher when the host vehicle departs in the left-hand direction from the left-hand lane than when the host vehicle departs in the right-hand direction from the left-hand lane. This is because the road shoulder is in the left-hand direction from the left-hand lane, and there is a high possibility that the road shoulder is a wall, guardrail, obstacle, or cliff. Based on this fact, when the host vehicle departs in the left-hand direction from the left-hand lane to the road shoulder, the host vehicle 100A has a higher possibility of making contact or the like with these objects. Hence, when the host vehicle 100A is traveling in the left-hand lane, it is determined that the left-hand direction is the first obstacle-containing direction Sout (Sout=left).

When the host vehicle 100B is traveling in the center lane, the level of risk is the same in both the left and right directions with respect to the current driving lane because the host vehicle 100B would still be on the road were departure to occur in either direction.

When the host vehicle 100C is traveling in the right-hand lane, the level of risk is higher when the host vehicle departs in the right-hand direction, to the opposing lane than when the host vehicle departs in the left-hand direction to the neighboring lane. Hence, in this case, when the host vehicle 100A is traveling in the right-hand lane, it is determined that the right-hand direction is the first obstacle-containing direction Sout (Sout=right).

In comparison with expressways, ordinary roads have a narrower road shoulder width, there are many obstacles on the road shoulder, and pedestrians are also present. For this reason, the level of risk is higher for departure toward the road shoulder on an ordinary road than when the host vehicle departs toward the road shoulder on an expressway.

Comparing the number of lanes, the level of risk is higher when the left-hand direction is the road shoulder, and one side of the road is a single lane in which the right-hand direction is the opposing lane. In this case, it is determined that both the left and right directions are a first obstacle-containing direction Sout (Sout=both).

Most two-lane, two-way roads, for example, do not have a median strip, a guardrail or another divider, so the imaging picture when the host vehicle is traveling on the two-lane, two-way road is one such as that shown in the picture (A) of FIG. 5 for countries that drive on the left side of the road and such as that shown in the picture (C) of FIG. 5 for countries that drive on the right side of the road. In other words, the imaging picture when the host vehicle is traveling on a two-lane, two-way road is the same imaging picture taken by the imaging unit 13 of the host vehicle 100A traveling in the left-hand lane of a three-lane road for countries that drive on the left side of the road. Hence, assuming that both ordinary roads and expressways are traveled, the first direction with an obstacle cannot be determined solely by using an imaging picture. Based on this fact, the number of lanes in the road on which the host vehicle is currently traveling is obtained from the navigation device 15, and by making a determination as to whether the road currently being traveled is two-lane, two-way road or a three-lane, one-way road, it can be determined that the level of safety risk is high in the right-hand direction as well when a two-lane, two-way road is being traveled.

Figure 2:
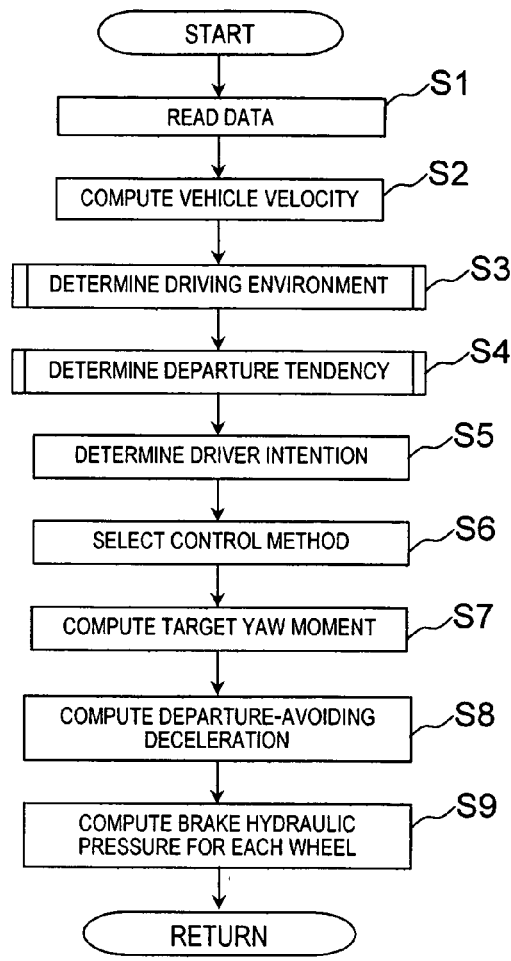
FIG. 2 is a flowchart showing the processing content of the brake driving force control unit comprising the lane departure prevention apparatus.

Determination of the driving environment in step S3 shown in FIG. 2 is performed with the processing procedure shown in FIG. 3 described above.

Figure 6:
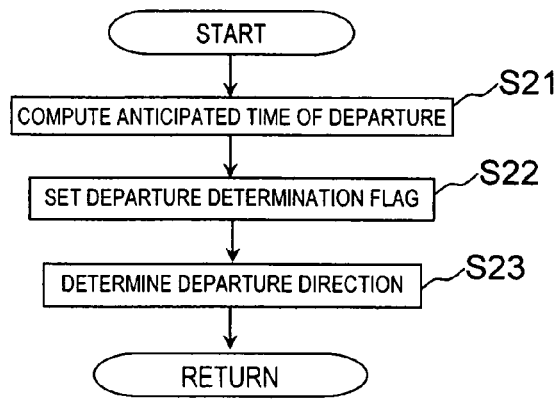
FIG. 6 is a flowchart showing the processing content for determining the departure tendency by the brake driving force control unit.

Determination of the lane departure tendency is performed in the subsequent step S4. The processing procedure for processing this determination is specifically shown in FIG. 6.

First, the estimated time of departure Tout is calculated in step S21. More specifically, the estimated time of departure Tout is calculated with Equation (2) shown below by designating dx as the amount of variation (amount of variation per unit time) of the lateral displacement X, designating L as the lane width, and using the lateral displacement X (see, FIG. 7 for the values of X, dx, and L).

$$Tout=(L/2-X)/dx \qquad (2)$$

The estimated time of departure Tout until the host vehicle 100 laterally displaced by an amount equal to the lateral displacement X from the center of the lane (X=0) arrives at an externally positioned area (road shoulder, for example) separated by an amount equal to the distance L/2 from the center of the lane can be computed with Equation (2). The lane width L is obtained from the imaging picture processed by the imaging unit 13. The position of the host vehicle can also be obtained from the navigation device 15, and the lane width L can be obtained from the map data stored in the navigation device 15.

The departure determination flag is set in the subsequent step S22. More specifically, the estimated time of departure Tout is compared with a predetermined first departure-determining threshold Ts. Here, when the estimated time of departure Tout is less than the first departure-determining threshold Ts (Tout<Ts), it is determined that departure will occur (departure tendency exists), and the departure determination flag Fout is set to ON (Fout=ON). When the estimated time of departure Tout is equal to or greater than the first departure-determining threshold Ts (Tout≧Ts), it is determined that departure will not occur (departure tendency does not exist), and the departure determination flag Fout is set to OFF (Fout=OFF).

When the host vehicle moves away from the center of the lane and the estimated time of departure Tout is less than the first departure-determining threshold Ts (Tout<Ts), the departure determination flag Fout is switched ON (Fout=ON) by the processing of step S22. When the host vehicle is in a state in which Fout=ON and returns to the center side of the lane, then the estimated time of departure Tout is equal to or greater than the first departure-determining threshold Ts (Tout≧Ts), and the departure determination flag Fout is switched OFF (Fout=OFF). When a departure tendency exists and, for example, if braking control (described hereinafter) is performed for avoiding lane departure, or if the driver himself takes evasive actions, then the departure determination flag Fout is switched from ON to OFF.

The first departure-determining threshold Ts is variable. In other words, the first departure-determining threshold Ts can also be set, for example, based on the level of risk obtained in step S3.

The departure direction Dout is subsequently determined based on the lateral displacement X in the step S23. More specifically, when the host vehicle is laterally displaced from the center of the lane in the left-hand direction, then that direction is set as the departure direction Dout (Dout=left). When the host vehicle is laterally displaced from the center of the lane in the right-hand direction, then that direction is set as the departure direction Dout (Dout=right).

The lane departure tendency is determined in step S4 as described above.

The intention of the driver to change lanes is determined in the subsequent step S5. More specifically, the intention of the driver to change lanes is determined as follows based on the steering angle δ and/or the turn switch signal obtained in step S1.

When the direction (lighted blinker side) indicated by the turn switch signal and the direction indicated by the departure direction Dout obtained in step S4 are the same, it is determined that the driver is intentionally changing lanes, and the departure determination flag Fout is changed to OFF (Fout=OFF). In other words, the determination result is changed, indicating that departure will not occur.

When the direction (lighted blinker side) indicated by the turn switch signal and the direction indicated by departure direction Dout obtained in step S4 are different, the departure determination flag Fout is maintained, and the departure determination flag Fout is left ON (Fout=ON). In other words, the determination result is maintained, indicating that departure will occur.

When the turn signal switch 20 has not been operated, the driver intention to change lanes is determined based on the steering angle δ. In other words, in the case that the driver steers in the departure direction, it is determined that the driver is intentionally changing lanes when the steering angle δ and the amount of variation Δδ (amount of variation per unit time) in the steering angle are equal to or greater than a set value, and the departure determination flag Fout is changed to OFF (Fout=OFF).

The control method for departure avoidance is selected in the subsequent step S6. More specifically, a determination is made as to whether or not to issue a departure alarm and/or to perform departure-avoiding braking control. The braking control method is selected when the departure-avoiding braking control is performed.

More specifically, the departure alarm is issued in accordance with the ON and OFF state of the departure determination flag Fout obtained in step S5. Even more specifically, when the departure determination flag Fout is ON (Tout<Ts), i.e., when the estimated time of departure Tout is less than the first departure determination threshold Ts, then a departure alarm is issued when it can be determined that lane departure can be prevented by the driver performing a steering operation or the like. The alarm is issued with a sound, a display or the like, for example.

As described herein, situations exist in which the departure determination flag Fout is ON (Tout<Ts) but it can nevertheless be determined that lane departure can be prevented by the driver performing a steering operation or the like. For example, those situations include ones in which the driver himself realizes the lane departure tendency of the host vehicle, and then takes evasive actions, but the departure determination flag Fout itself is still ON (Tout<Ts).

In the case that the departure determination flag Fout is ON (Tout<Ts), the braking control method is also selected based on the first obstacle-containing direction Sout obtained in step S3 and the second departure direction Dout obtained in step S4. Furthermore, the braking control method is also preferably selected based on the host vehicle velocity V and the estimated time of departure Tout. The procedure is described in detail hereinafter.

The target yaw moment generated in the host vehicle is calculated in the subsequent step S7. This target yaw moment is a yaw moment imparted to the host vehicle for departure avoidance. More specifically, the target yaw moment Ms is calculated with Equation (3) below based on the amount of variation dx and the lateral displacement X obtained in step S1.

$$Ms = K1 \cdot X + K2 \cdot dx \quad (3)$$

Figure 8:
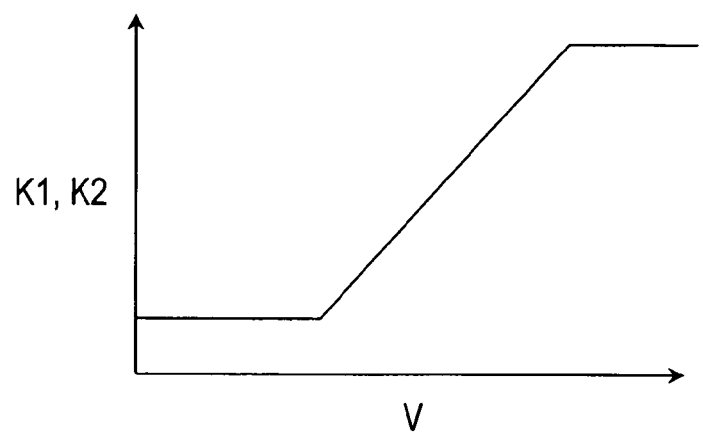
FIG. 8 is a characteristics diagram showing the characteristics of gains K1 and K2 that are used for calculating the yaw moment Ms.

In the Equation (3), the terms K1 and K2 are the gains that vary in accordance with the host vehicle velocity V. For example, in FIG. 8, the gains K1 and K2 have low values at low speeds, increase in a corresponding relationship with the host vehicle velocity V when the host vehicle velocity V reaches a certain value, and remain constant thereafter when a certain vehicle velocity V is reached.

The departure-avoiding deceleration is calculated in the subsequent step S8. In other words, the braking force applied to both the left and right wheels is calculated with the aim of decelerating the host vehicle. Here, such a braking force is calculated as target brake hydraulic pressures Pgf and Pgr applied to both the left and right wheels. The target brake hydraulic pressure Pgf for the front wheels is calculated with Equation (4) below.

$$Pgf = Kgv \cdot V + Kgx \cdot dx \quad (4)$$

Figure 9:
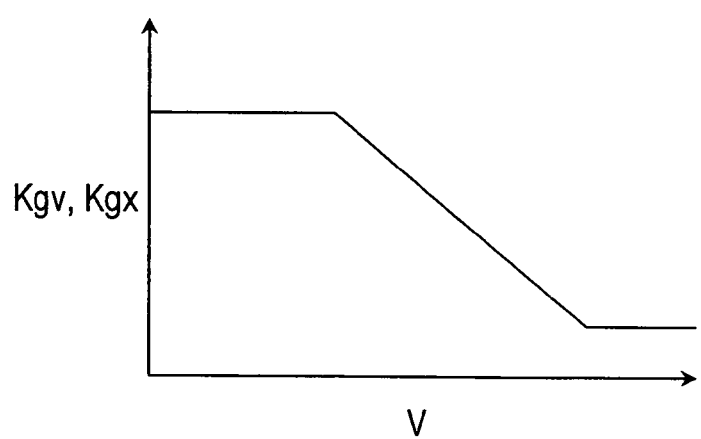
FIG. 9 is a characteristics diagram showing the characteristics of conversion factors Kgv and Kgx that are used for calculating the target brake hydraulic pressure Pgf.

In the Equation (4), the terms Kgv and Kgx are conversion factors for converting the braking force into brake hydraulic pressure. The conversion factors Kgv and Kgx are respectively set based on the host vehicle velocity V and the amount of lateral displacement dx. For example, in FIG. 9 the conversion factors Kgv and Kgx have high values at low speeds, decrease in a corresponding relationship with the host vehicle velocity V when the host vehicle velocity V reaches a certain value, and remain constant thereafter when a certain vehicle velocity V is reached.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S8.

The target brake hydraulic pressure for each wheel is calculated in the subsequent step S9. In other words, the final brake hydraulic pressure is calculated based on the presence of departure-avoiding braking control. More specifically, the calculation is performed in the following manner.

(1) When the departure determination flag Fout is OFF (Fout=OFF), i.e., when it is determined that departure will not occur, the target brake hydraulic pressure Psi (i=fl, fr, rl, rr) for each wheel is set as the master cylinder hydraulic pressure Pmf or Pmr, as shown in Equations (5) and (6) below.

$$Psfl = Psfr = Pmf \quad (5)$$

$$Psrl = Psrr = Pmr \quad (6)$$

In the Equations (5) and (6), the term Pmf is the master cylinder hydraulic pressure for the front wheels, while the term Pmr is the master cylinder hydraulic pressure for the rear wheels. The rear wheel master cylinder hydraulic pressure Pmr is a value calculated based on the master cylinder hydraulic pressure Pmf for the front wheels while taking the front and rear braking distribution into consideration.

(2) When the departure determination flag Fout is ON (Fout=ON), i.e., when it is determined that departure will occur, the front wheel target brake hydraulic pressure difference ΔPsf and the rear wheel target brake hydraulic pressure difference ΔPsr are first calculated based on the target yaw moment Ms. More specifically, the target brake hydraulic pressure differences ΔPsf and ΔPsr are calculated with Equations (7) to (10) below.

$$\text{When } Ms < Ms1, \text{ then } \Delta Psf = 0 \quad (7)$$

$$\Delta Psr = 2 \cdot Kbr \cdot Ms/T \quad (8)$$

$$\text{When } Ms \geq Ms1, \text{ then } \Delta Psf = 2 \cdot Kbf \cdot (Ms - Ms1)/T \quad (9)$$

$$\Delta Psr = 2 \cdot Kbr \cdot Ms1/T \quad (10)$$

In the Equations (7) to (10), the term Ms1 is the threshold used for setting purposes, while the term T is the tread. The tread T is the same value for simplicity. The terms Kbf, and Kbr are conversion factors for the front and rear wheels when the braking force is converted to brake hydraulic pressure, and are set according to brake parameters.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the departure determination flag Fout is ON (Fout=ON), the final target brake hydraulic pressure Psi (i=fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S6.

The braking control method selected in step S6 will now be described.

Figure 10:
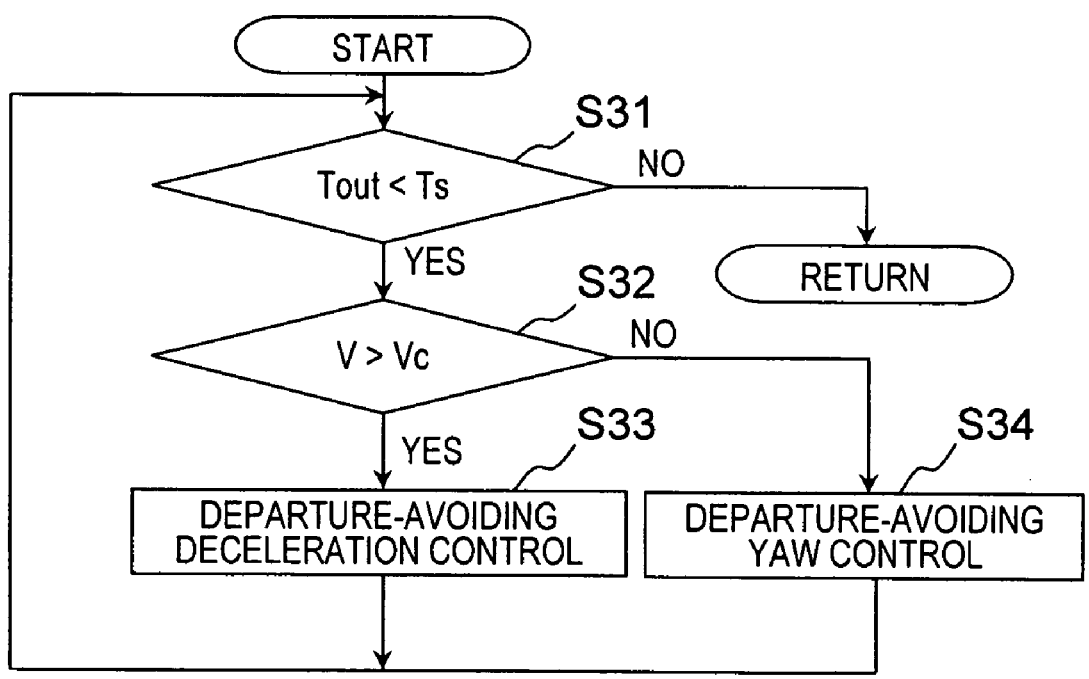
FIG. 10 shows the processing of the brake driving force control unit, and is a flowchart showing the processing content for selecting the braking control method based on the host vehicle velocity V and the estimated time of departure Tout.
Figure 13:
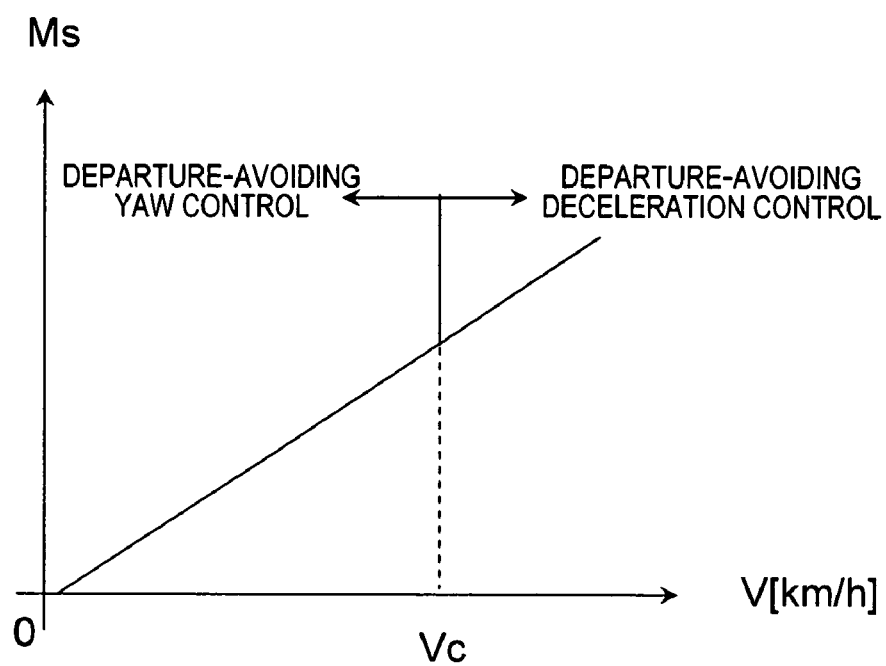
FIG. 13 is a characteristics diagram used for describing the departure-avoiding deceleration control and departure-avoiding yaw control that are performed based on the host vehicle velocity V.

In step S6, when the departure determination flag Fout is ON, the braking control method is selected based on the first obstacle-containing direction Sout and the departure direction Dout. Alternatively, in step S6, when the departure determination flag Fout is ON, the braking control method is selected based on the host vehicle velocity V and the estimated time of departure Tout as indicated in FIGS. 10 and 13.

First, the braking control method selected based on the first obstacle-containing direction Sout and the departure direction Dout when the departure determination flag Fout is ON will be described below for various relationships between the first obstacle-containing direction Sout and the departure direction Dout (first case to third case).

In the first case, when there is no match between the first obstacle-containing direction Sout and the departure direction Dout, the braking control (hereinafter referred to as "departure-avoiding yaw control") is carried out so that a yaw moment is imparted to the host vehicle for avoiding departure until the departure determination flag Fout is OFF.

Here, the magnitude of the yaw moment imparted to the host vehicle in order to avoid departure is the target yaw moment Ms. The yaw moment is imparted to the host vehicle by creating a difference in the braking force applied to the left and right wheels. More specifically, when the target yaw moment Ms is less than the threshold Ms1 used for setting purposes, a braking force difference is generated in the left and right rear wheels to impart the target yaw moment Ms to the host vehicle. When the target yaw moment Ms is equal to or greater than the threshold Ms1 used for setting purposes, a braking force difference is generated in the front and rear left and right wheels to impart the target yaw moment Ms to the host vehicle, as described above.

The departure determination flag Fout is switched from ON to OFF in cases in which departure-avoiding braking control has been carried out or the driver himself has taken evasive actions when there is a departure tendency.

In the second case, when there is a match between the first obstacle-containing direction Sout and the departure direction Dout, and the road type R obtained in step S3 is an ordinary road, the departure-avoiding yaw control is carried out until the departure determination flag Fout is OFF.

Furthermore, the second departure-determining threshold Tr, which is less than the first departure-determining threshold Ts (Ts>Tr>0), is defined. When the estimated time of departure Tout becomes less than the second departure-determining threshold Tr (Tout<Tr), the departure-avoiding yaw control is applied, and the braking control for decelerating the host vehicle (hereinafter referred to as "departure-avoiding deceleration control") is carried out. The departure-avoiding deceleration control is carried out so as to provide substantially equal braking force to both the left and right wheels.

Here, the estimated time of departure Tout is an indicator of the magnitude of the departure tendency, so an estimated time of departure that is less than the second departure-determining threshold Tr corresponds to the departure tendency being greater than the second threshold.

In the third case, when there is a match between the first obstacle-containing direction Sout and the departure direction Dout, and the road type R obtained in step S3 is an expressway, the departure-avoiding yaw control is carried out until the departure determination flag Fout is OFF.

Furthermore, in this third case, when the estimated time of departure Tout has reached 0, the departure-avoiding yaw control is applied, and the departure-avoiding deceleration control is carried out.

In the third case, the departure-avoiding deceleration control can also be carried out when the estimated time of departure Tout has become less than the second departure-determining threshold Tr, in the same manner as in the second case. In this case, when the estimated time of departure Tout becomes 0, for example, the deceleration of the host vehicle is increased by departure-avoiding deceleration control. Therefore, the departure-avoiding deceleration control is configured so as to be actuated when the estimated time of departure Tout has become less than the second departure-determining threshold Tr, and when the estimated time of departure Tout becomes 0. When the estimated time of departure Tout becomes 0 in this case, the deceleration of the host vehicle is further increased.

Following is a description of a braking control method selected based on the host vehicle velocity V and the estimated time of departure Tout when the departure determination flag Fout is ON. More specifically, the departure-avoiding deceleration control is performed prior to the departure-avoiding yaw control based on the host vehicle velocity V and the estimated time of departure Tout. Here, the processing procedure thereof is described with reference to FIG. 10.

First, the estimated time of departure Tout is compared with the first departure-determining threshold Ts in step S31. Here, when the estimated time of departure Tout is less than the first departure-determining threshold Ts (Tout<Ts), the system advances to step S32, and when the estimated time of departure Tout is equal to or greater than the first departure-determining threshold Ts (Tout≧Ts), the system skips the processing shown in FIG. 10.

In step 32, the host vehicle velocity V is compared with a predetermined velocity threshold Vc, which is the first velocity threshold. Here, the velocity threshold Vc is the limit of the velocity at which the host vehicle can be stably driven when a yaw moment is imparted to the host vehicle on a predetermined road for which the road surface μ is the lower limit equivalent of a paved road. In other words, the velocity threshold Vc is the stable limit velocity of the host vehicle that is obtained using the equation of motion of the host vehicle on the assumption that a yaw moment is imparted. In other words, the host vehicle behavior tends to be unstable when yaw moment is imparted at a velocity higher than the threshold Vc. This threshold Vc is set in accordance with the magnitude of the yaw moment imparted for departure avoidance to the host vehicle.

Here, when the host vehicle velocity V is greater than the threshold Vc (V>Vc), the system advances to step S33, and when the host vehicle velocity V is equal to or less than the threshold Vc (V≦Vc), the system advances to step S34.

The departure-avoiding deceleration control is selected in step S33. Processing is then restarted from step S31.

On the other hand, the departure-avoiding yaw control is selected in step S34. Processing is then restarted from step S31.

As long as the host vehicle velocity V is greater than the threshold Vc, and the estimated time of departure Tout is less than the first departure-determining threshold Ts, departure-avoiding deceleration control is performed. When the estimated time of departure Tout is less than the first departure-determining threshold Ts, and the host vehicle velocity V is equal to or less than the threshold Vc, then the departure-avoiding yaw control is performed.

The braking control method performed in the first to third cases can sometimes be different from the braking control method performed based on the host vehicle velocity V and the estimated time of departure Tout. In such cases, the braking control method based on the host vehicle velocity V and the estimated time of departure Tout is given priority.

In step S5, the departure determination flag Fout is changed to OFF (Fout=OFF) when the direction (lighted blinker side) indicated by the turn switch signal and the direction indicated by the second departure direction Dout obtained in step S4 are the same. Also, when the estimated time of departure Tout is less than the first departure-determining threshold Ts (Tout<Ts), the departure determination flag Fout is set to ON. Hence, the processing in FIG. 10 is based on the condition that the departure determination flag Fout is ON.

The braking control methods are selected in step S6 in accordance with the first obstacle-containing direction Sout and the departure direction Dout in this manner. In other words, the braking control method for departure avoidance is selected by departure-avoiding yaw control alone or by a combination of the departure-avoiding yaw control and the departure-avoiding deceleration control in accordance with the first obstacle-containing direction Sout and the departure direction Dout and/or in accordance with the host vehicle velocity V and the estimated time of departure Tout.

The target brake hydraulic pressure Psi (i=fl, fr, rl, rr) for each wheel is calculated in step S9 in accordance with each type of braking control method.

In the departure-avoiding yaw control for the first to third cases, for example, the target brake hydraulic pressure Psi (i=fl, fr, rl, rr) for each wheel is calculated with Equation (11) below.

$$Psfl = Pmf$$

$$Psfr = Pmf + \Delta Psf$$

$$Psrl = Pmr$$

$$Psrr = Pmr + \Delta Psr \qquad (11)$$

The departure-avoiding yaw control and the departure-avoiding deceleration control are carried out in the second and third cases, but in this case the target brake hydraulic pressure Psi (i=fl, fr, rl, rr) for each wheel is calculated with Equation (12) below.

$$Psfl = Pmf + Pgf/2$$

$$Psfr = Pmf + \Delta Psf + Pgf/2$$

$$Psrl = Pmr + Pgr/2$$

$$Psrr = Pmr + \Delta Psr + Pgr/2 \qquad (12)$$

Also, the target brake hydraulic pressure Psi (i=fl, fr, rl, rr) for each wheel is calculated with reference to the deceleration action taken by the driver. In other words, the master cylinder hydraulic pressures Pmf and Pmr is applied, as shown in Equations (11) and (12).

The above describes the processing for step S9. Thus, the target brake hydraulic pressure Psi (i=fl, fr, rl, rr) for each wheel is calculated based on the state of the departure determination flag Fout in step S9. When the departure determination flag Fout is ON, the target brake hydraulic pressure Psi (i=fl, fr, rl, rr) for each wheel is calculated in accordance with the braking control methods selected in step S6 in response to the relationship between the first obstacle-containing direction Sout and the departure direction Dout.

Described above is the computational processing performed by the brake driving force control unit 8. With the brake driving force control unit 8, the target brake hydraulic pressure Psi (i=fl, fr, rl, rr) calculated for each wheel in step S9 is output to the brake hydraulic pressure control unit 7 as a brake hydraulic pressure command value.

The lane departure prevention apparatus described above operates according to the following overview.

First, various data is read from the sensors, the controllers, and the control units (step S1). The host vehicle velocity V is subsequently calculated (step S2).

Next, in step S3, the driving environment is determined and the direction (first obstacle-containing direction Sout) in which the risk level is high is selected (see, FIG. 3). For example, when the host vehicle 100A is traveling in the left lane in FIG. 4, the first obstacle-containing direction Sout is set as the left-hand direction.

Figure 7:
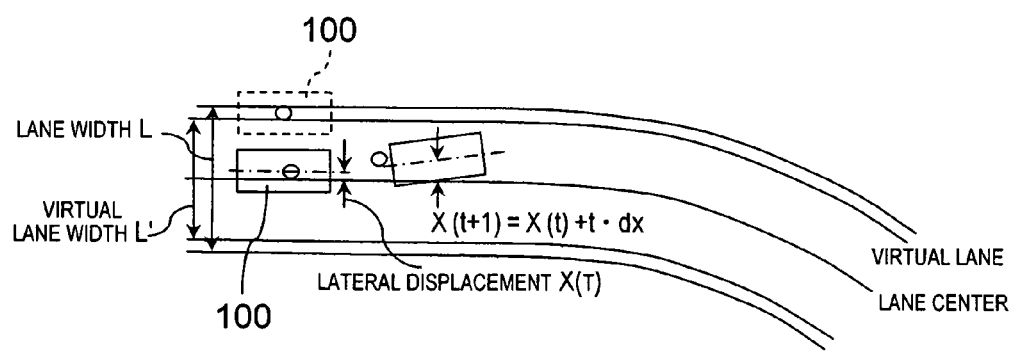
FIG. 7 is a diagram used for describing the estimated time of departure Tout.

In step S4, the departure determination flag Fout is set based on the estimated time of departure Tout, and the departure direction Dout is determined based on the lateral displacement X (see, FIG. 7).

Furthermore, the driver's intention to change lanes is determined based on the departure direction Dout obtained in this manner and on the direction (lighted blinker side) indicated by the turn switch signal (step S5).

For example, when the direction (lighted blinker side) indicated by the turn switch signal and the direction indicated by the departure direction Dout are the same, it is determined that the driver is intentionally changing lanes. In this case, the departure determination flag Fout is changed to OFF.

When the direction (lighted blinker side) indicated by the turn switch signal and the direction indicated by the departure direction Dout are different, the departure determination flag Fout is kept unchanged in the case that it is ON. The reason is that when the direction (lighted blinker side) indicated by the turn switch signal and the direction indicated by the departure direction Dout are different, the departure behavior of the host vehicle may be due to factors other than the driver's intention to change lanes or the like, so the condition of the departure determination flag Fout is kept unchanged when the flag is ON.

The start of an alarm for departure avoidance, the presence or absence of the departure-avoiding braking control, and the method for carrying out departure-avoiding braking control are selected based on the departure determination flag Fout, the first obstacle-containing direction Sout, and the departure direction Dout (step S6).

Furthermore, the target yaw moment Ms is calculated based on the lateral displacement X and the variation amount dx (step S7), and departure-avoiding deceleration is also calculated (step S8).

The target brake hydraulic pressure Psi (i=fl, fr, rl, rr) applied to each wheel is calculated for carrying out the braking control method selected based on the departure determination flag Fout, the first obstacle-containing direction Sout, and the departure direction Dout. The target brake hydraulic pressure Psi (i=fl, fr, rl, rr) is output to the brake hydraulic pressure control unit 7 as a brake hydraulic pressure command value (step S9). In the brake hydraulic pressure control unit 7, the brake hydraulic pressure is individually controlled for the wheel cylinders 6FL to 6RR based on the brake hydraulic pressure command value. Therefore, the configuration is such that when there is a departure tendency, a predetermined vehicle behavior is exhibited in accordance with the driving environment.

Figure 11:
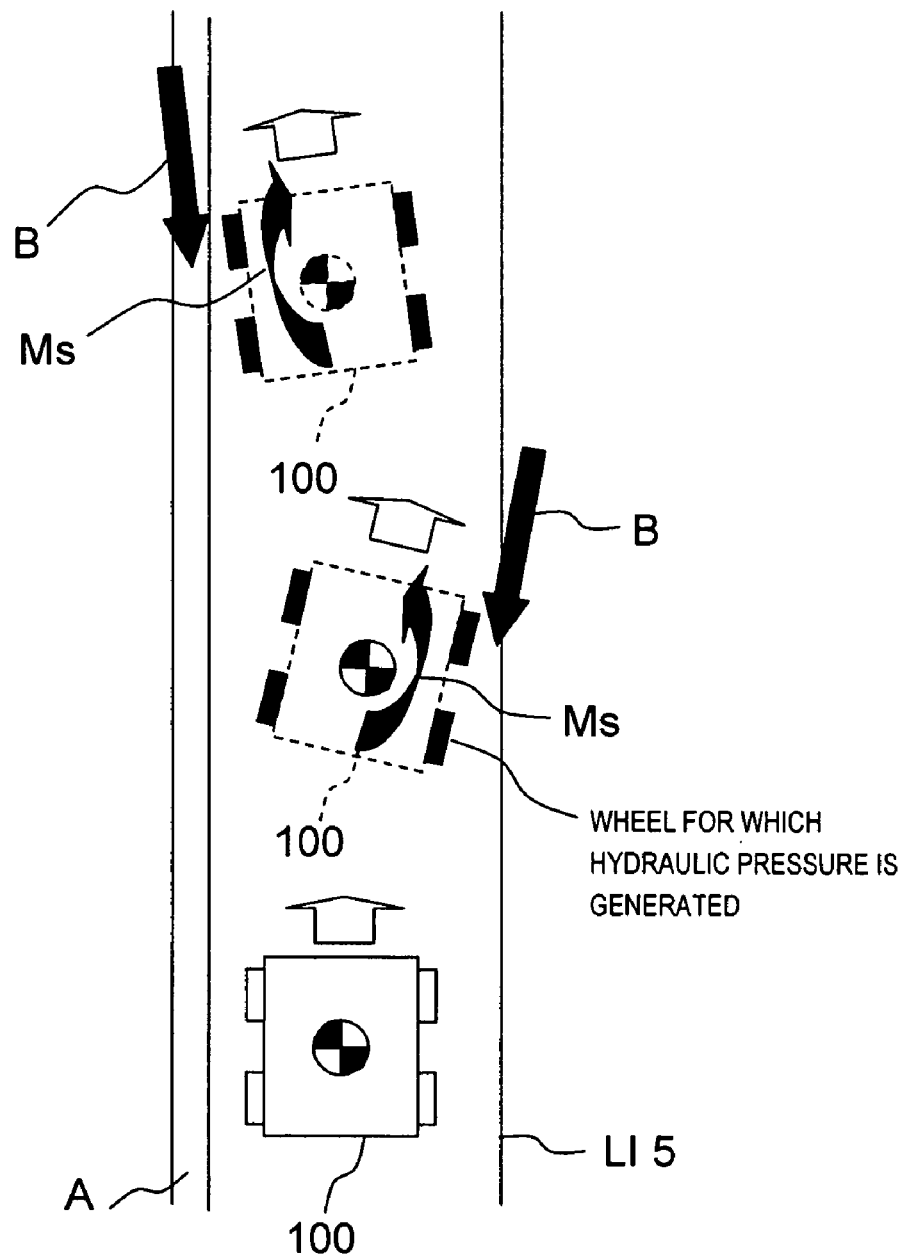
FIG. 11 is a diagram used for describing the braking control method in the second case.
Figure 12:
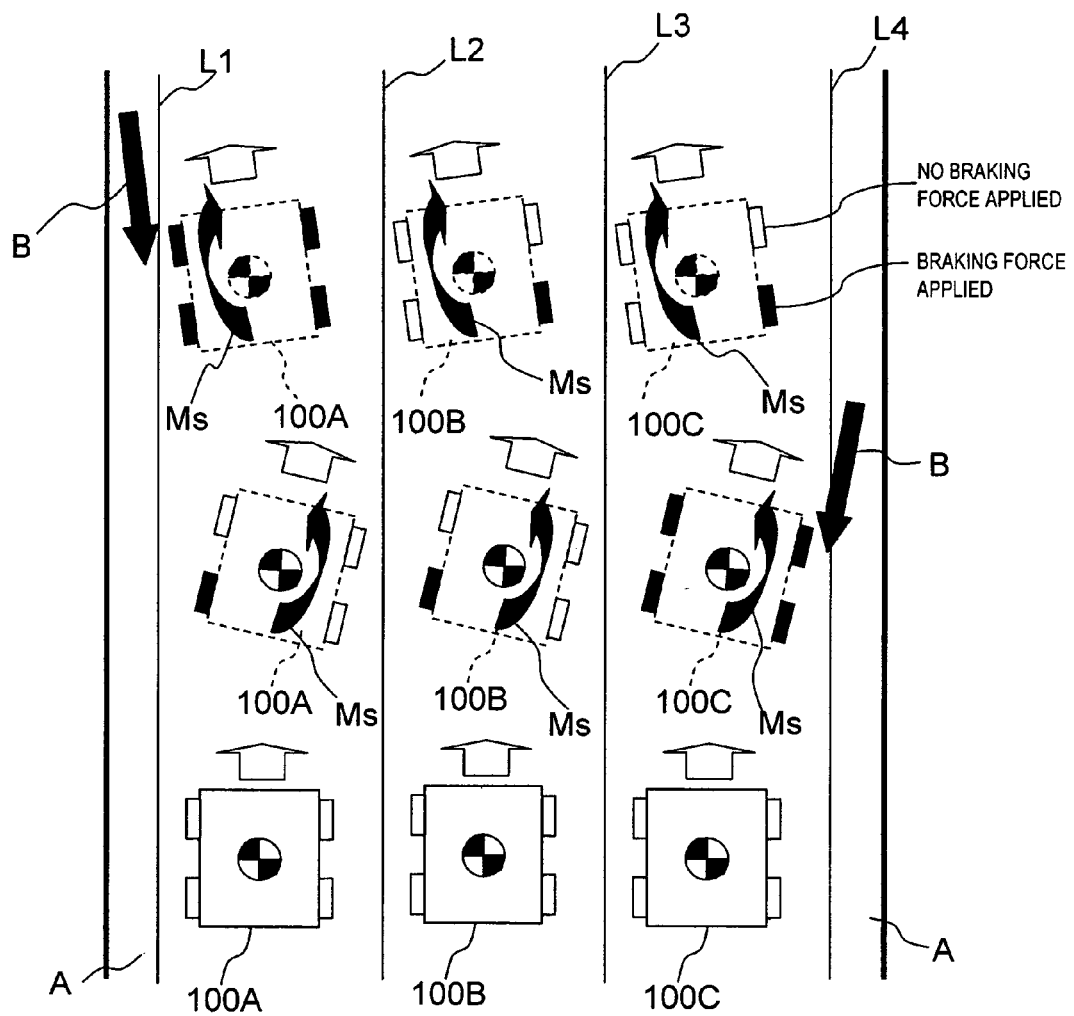
FIG. 12 is a diagram used for describing the braking control method in the third case.

Here, the manner in which the host vehicle behaves when braking control is carried out is described for the first to third cases with reference to FIGS. 11 and 12.

The second case, as described above, is one in which there is a match between the first obstacle-containing direction Sout and the departure direction Dout, and where the road type R is an ordinary road. In other words, when the host vehicle 100 is traveling on a two-lane, two-way road wherein the road shoulder A is to the left and the opposing lane (center lane LI5 side) is to the right, there are cases in which the host vehicle 100 (the host vehicle 100 in the uppermost position of FIG. 11) may tend to depart in the left-hand direction, and cases in which the host vehicle (the host vehicle 100 in the center position of FIG. 11) may tend to depart in the right-hand direction, as shown in FIG. 11.

In this case, the departure-avoiding yaw control is carried out. Furthermore, when the estimated time of departure Tout becomes less than the second departure-determining threshold Tr, the departure-avoiding yaw control is applied, and the departure-avoiding deceleration control is carried out. The host vehicle thereby avoids departure. The driver can feel the departure avoidance action as acceleration in the lateral direction or as deceleration in the direction of travel, and know that the host vehicle has a tendency to depart.

The third case, as described above, is one in which there is a match between the first obstacle-containing direction Sout and the departure direction Dout, and where the road type R is an expressway. In other words, this is a case in which the host vehicle 100A (host vehicle 100A in the uppermost position of FIG. 12) traveling in the left-hand lane on a three-lane, one-way road has a tendency to depart in the left-hand direction, as shown in FIG. 12. An alternative case is one in which the host vehicle 100C. (host vehicle 100C in the center position of FIG. 12) traveling in the right-hand lane on a three-lane, one-way road has a tendency to depart in the right-hand direction, as shown in FIG. 12.

In this case, departure-avoiding yaw control is carried out. The host vehicle can thereby avoid departure. Furthermore, when the estimated time of departure Tout reaches 0, in other words, when it is determined that the host vehicle has departed from the driving lane, the departure-avoiding yaw control is applied, and the departure-avoiding deceleration control is carried out.

The wheels colored in black in FIGS. 11 and 12 are those in which hydraulic pressure is generated and braking force is provided. In other words, when either one of the left and right wheels is a wheel colored in black, there is a difference in hydraulic pressure or braking force in the left and right wheels. This case shows a yaw moment imparted to the host vehicle. Also, when the left and right wheels are colored in black, there can still be a difference in the hydraulic pressure values thereof, in which case the host vehicle undergoes controlled deceleration while a yaw moment is simultaneously imparted to the host vehicle. Such a relationship applies to the remainder of the diagrams.

The first case, as described above, is one in which there is no match between the first obstacle-containing direction Sout and the departure direction Dout. In other words, there are cases in which the host vehicle 100A (host vehicle 100A in the center position of FIG. 12) traveling in the left-hand lane on a three-lane, one-way road has a tendency to depart in the right-hand direction, as shown in FIG. 12. There are also cases in which the host vehicle 100C (host vehicle 100C in the lowermost position of FIG. 12) traveling in the right-hand lane on a three-lane, one-way road has a tendency to depart in the left-hand direction, as shown in FIG. 12. There are furthermore cases in which the host vehicle 100B traveling in the center lane has a tendency to depart in the left-hand or right-hand direction. The departure-avoiding yaw control is carried out in this case. The host vehicle can thereby avoid departure.

As long as the host vehicle velocity V is greater than the threshold Vc, and the estimated time of departure Tout is less than the first departure-determining threshold Ts, the departure-avoiding deceleration control is performed. When the estimated time of departure Tout is less than the first departure-determining threshold Ts, and the host vehicle velocity V is equal to or less than the threshold Vc, then the departure-avoiding yaw control is performed.

A description is provided here with reference to FIG. 13. FIG. 13 shows the relationship between velocity and the target yaw moment Ms. FIG. 13 shows the case in which the target yaw moment Ms changes proportionally with respect to the host vehicle velocity V.

As shown in FIG. 13, as long as the host vehicle velocity V is greater than the threshold Vc, the departure-avoiding deceleration control is performed. When the host vehicle velocity V is equal to or less than the threshold Vc, then the departure-avoiding yaw control is performed, with the estimated time of departure Tout being less than the first departure determination flag Ts as a precondition. The departure-avoiding yaw control is a type of control in which the target yaw moment Ms that corresponds to the host vehicle velocity V is taken as the target value.

Braking control for this type of departure avoidance is performed and an alarm is issued with a sound or display. The alarm is initiated with a predetermined timing in advance of braking control, or simultaneously with braking control, for example.

Next, the effects of the first embodiment are described.

As described above, when the host vehicle velocity V is greater than the threshold Vc, and the estimated time of departure Tout is less than the first departure-determining threshold Ts, the departure-avoiding deceleration control is performed, and when the estimated time of departure Tout is less than the first departure-determining threshold Ts, and the host vehicle velocity V is equal to or less than the threshold Vc, departure-avoiding yaw control is performed. The departure-avoiding yaw control can thereby be actuated after the traveling condition of the host vehicle has been optimized, so vehicle behavior can be stabilized and lane departure can be prevented.

The threshold Vc is set as the host vehicle velocity limit at which the host vehicle can stably travel (that is to say, show a steady vehicle behavior) even when a yaw moment is imparted to the host vehicle. As a result, the departure-avoiding yaw control can be actuated at an optimal velocity. In other words, the threshold Vc fulfills the demand that the departure-avoiding yaw control be performed as soon as possible, and also fulfills the demand that the departure-avoiding yaw control be performed with a stable vehicle behavior. As a result of this, the driver can be prevented from being annoyed by the departure-avoiding deceleration control and the departure-avoiding yaw control as such because the departure-avoiding deceleration control can be prevented from operating unnecessarily. In other words, the driver can be prevented from being annoyed because the departure-avoiding deceleration control can be caused to operate only to the minimal extent.

The embodiments of the present invention have been described above. However, the present invention is not limited to being implemented using the above-described embodiments. In other words, described in the above embodiment is a case in which departure-avoiding deceleration control is performed solely when the host vehicle velocity V is greater than the threshold Vc, and the estimated time of departure Tout is less than the first departure-determining threshold Ts. However, it is apparent that the present invention is not limited thereby. In other words, departure-avoiding deceleration control can be performed if the host vehicle velocity V is greater than the threshold Vc, and the departure-avoiding deceleration control can also be performed if the estimated time of departure Tout is less than the first departure-determining threshold Ts.

As described above, the departure-avoiding yaw control is performed when there is no match between the first obstacle-containing direction Sout and the departure direction Dout in cases in which the departure determination flag Fout is ON. In other words, there is a lane departure tendency, when there is no match between the first obstacle-containing direction Sout and the departure direction Dout and the lane departure determination flag Fout is ON (first case). On the other hand, when there is a departure tendency (departure determination flag Fout is ON) and there is a match between the first obstacle-containing direction Sout and the departure direction Dout (the above-described second and third cases), the braking control is still performed for departure avoidance by using the departure-avoiding yaw control in conjunction with the departure-avoiding deceleration control. More specifically, the departure-avoiding yaw control is initiated, and the departure-avoiding deceleration control is thereafter caused to intervene with a predetermined timing.

Thus, the departure direction Dout indicates the direction in which an obstacle is present when the host vehicle has departed. As a result, the braking control is performed when there is a match between the first obstacle-containing direction Sout and the departure direction Dout such that the lane departure tendency is in the direction in which an obstacle is present. With this type of braking control, the departure-avoiding yaw control is applied and the departure-avoiding deceleration control is subsequently performed. By performing the departure-avoiding deceleration control in addition to the departure-avoiding yaw control, the driver can be prevented from feeling discomfort even when the host vehicle has departed from the driving lane.

More specifically, when there is a departure tendency toward the road shoulder, the driver can be prevented from feeling discomfort even when the host vehicle has departed from the driving lane, by initiating the departure-avoiding yaw control and then causing the departure-avoiding deceleration control to intervene.

Similar to the case in which there is a lane departure tendency toward the opposing lane, the driver can be prevented from feeling discomfort by initiating the departure-avoiding yaw control and then causing the departure-avoiding deceleration control to intervene.

Furthermore, when there is a departure tendency, whether it be in the left- or right-hand direction, the departure-avoiding yaw control is initiated and then departure-avoiding deceleration control is caused to intervene in the case that the host vehicle is traveling on a two-lane, two-way road. The driver can thereby be prevented from feeling discomfort in a similar manner.

After the departure-avoiding yaw control is initiated, the departure-avoiding deceleration control can be prevented from frequently operating by causing the departure-avoiding deceleration control to intervene only when a certain condition is satisfied (more specifically, Tout<Tr). The driver can thereby be prevented from being annoyed by such departure-avoiding control.

As described above, when the estimated time of departure Tout is 0, i.e., when it has been determined that the host vehicle has departed the driving lane, the departure-avoiding yaw control is applied, and then the departure-avoiding deceleration control is performed. The host vehicle speed is high on an expressway, so when departure from the driving lane occurs, there is a possibility that considerable departure off the road may occur. Based on this fact, when it has been determined that the host vehicle has departed from the driving lane, the host vehicle can be prevented from considerably departing off the road by causing the departure-avoiding deceleration control to intervene.

Second Embodiment

Figure 14:
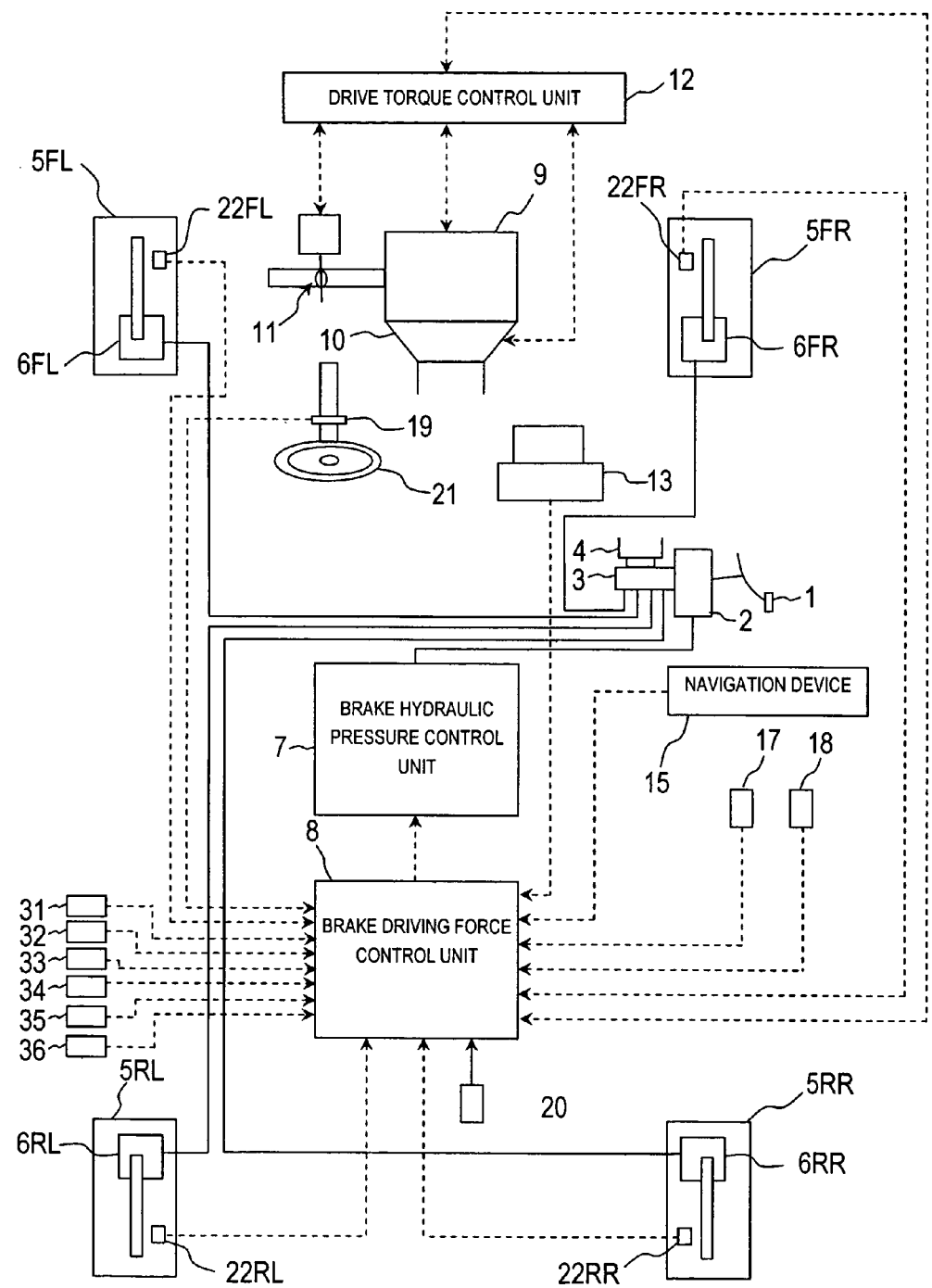
FIG. 14 is a schematic structural diagram showing a second embodiment of a vehicle equipped with the lane departure prevention apparatus of the present invention.

Referring now to FIG. 14, a lane departure prevention apparatus in accordance with a second embodiment will now be explained. As shown in FIG. 14, the host vehicle of the second embodiment has the same configuration of the host vehicle of the first embodiment but further comprises an ACC radar 31, a pair of rear lateral obstacle monitoring radars 32 and 33, a pair of lateral obstacle monitoring radars 34 and 35, and a rear obstacle monitoring radar 36. Unless mentioned otherwise, other configurations of the host vehicle of the second embodiment are the same as the configuration of the first embodiment. In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity.

In this second embodiment, the ACC radar 31 is configured and arranged to obtain information about vehicles or obstacles in a forward direction from the host vehicle in the adjacent lanes. More specifically, the ACC radar 31 obtains information about the presence or absence of forward vehicles or the like, and the relative distances Lfr and the relative velocities Vfr in relation to the forward vehicles or the like. With the ACC radar 31, the presence or absence of forward vehicles or the like is output to the brake driving force control unit 8, as are the relative distances Lfr and the relative velocities Vfr.

The rear lateral obstacle monitoring radars 32 and 33 are configured and arranged to obtain information about vehicles or obstacles in the rear lateral directions of the host vehicle. More specifically, the rear lateral obstacle monitoring radars 32 and 33 discover the presence of vehicles or the like in the rear lateral directions, and the relative distances Lbsr and the relative velocities Vbsr in relation to the rear lateral vehicles or the like. With the rear lateral obstacle monitoring radars 32 and 33 the presence or absence of rear lateral vehicles or the like is sent to the brake driving force control unit 8, as are the relative distances Lbsr and the relative velocities Vbsr.

The lateral obstacle monitoring radars 34 and 35 are configured and arranged to obtain information about vehicles or obstacles in the lateral directions of the host vehicle. More specifically, the lateral obstacle monitoring radars 34 and 35 obtain information about the presence or absence of vehicles or the like in the lateral directions, and the relative distances Lsr and the relative velocities Vsr in relation to the lateral vehicles or the like. With the lateral obstacle monitoring radars 34 and 35, the presence or absence of lateral vehicles or the like is output to the brake driving force control unit 8, as are the relative distances Lsr and the relative velocities Vsr.

The rear obstacle monitoring radar 36 is configured and arranged to obtain information about vehicles or obstacles rearward from the host vehicle. More specifically, the rear obstacle monitoring radar 36 obtains information about the presence or absence of rearward vehicles or the like, and the relative distances Lbr and relative velocities Vbr in relation to the rearward vehicles or the like. With the rear obstacle monitoring radar 36, the presence or absence of rearward vehicles or the like is output to the brake driving force control unit 8, as are the relative distances Lbr and relative velocities Vbr. Rearward vehicles or obstacles are those vehicles or obstacles that are present rearward of the host vehicle in the same lane as the host vehicle.

Next, the computational processing procedure that is performed by the brake driving force control unit 8 is described based on such a configuration. The computational processing procedure is substantially the same as the computational processing procedure of the first embodiment (FIG. 2). Thus, only those portions that differ will be described.

In other words, in step S1, the signals are read from the ACC radar 31, the rear lateral obstacle monitoring radars 32 and 33, the lateral obstacle monitoring radars 34 and 35, and the rear obstacle monitoring radar 36.

In the subsequent step S2, the host vehicle velocity V is calculated in the same manner as in the first embodiment. The driving environment is then determined in step S3. The processing for determining the driving environment is unique to the second embodiment.

In the first embodiment, the type of road on which the host vehicle is traveling and the driving lane of the host vehicle are detected, and the first obstacle-containing direction is obtained based on the detection results thereof. In the second embodiment, the direction in which the level of risk is high is determined based on the presence of other vehicles and obstacles obtained by way of the ACC radar 31.

In other words, when it has been determined based on the information (information regarding other vehicles and obstacles present in the forward direction) obtained from the ACC radar 31 that the level of risk is high in the left-hand direction as seen from the host vehicle, that direction is set as a high risk level direction (hereinafter referred to as "the second obstacle-containing direction") Aout (Aout=left). When it has been determined that the level of risk in the right-hand direction is high as seen from the host vehicle, that direction is set as the second obstacle-containing direction Aout (Aout=right). For example, when another vehicle or obstacle is present in the right diagonal forward direction of the host vehicle, the possibility of coming into contact with the other vehicle or the like is high if departure occurs in the right-hand direction, so the right-hand direction is set as the second obstacle-containing direction Aout (Aout=right).

When it has been determined that the level of risk is high in both directions as seen from the host vehicle, both directions are set as the second obstacle-containing direction Aout (Aout=both).

When it has been determined that the level of risk is high in the left-hand direction as seen from the host vehicle based on the information obtained from the rear lateral obstacle monitoring radars 32 and 33, that direction is set as a high risk level direction (hereinafter referred to as "the third obstacle-containing direction") RSout (RSout=left). When it has been determined that the level of risk in the right-hand direction is high as seen from the host vehicle, that direction is set as the third obstacle-containing direction RSout (RSout=right). In other words, for example, when a passing vehicle that is attempting to pass the host vehicle is detected in the right-hand lane, the right-hand direction is determined to be the third obstacle-containing direction RSout (RSout=right).

When the level of risk is high in both directions as seen from the host vehicle, both directions are determined to be a third obstacle-containing direction RSout (RSout=both).

When it has been determined that the level of risk is high in the left-hand direction as seen from the host vehicle based on the information obtained from the lateral obstacle monitoring radars 34 and 35, that direction is set as a high risk level direction (hereinafter referred to as "the fourth obstacle-containing direction") SDout (SDout=left). When it has been determined that the level of safety risk in the right-hand direction is high as seen from the host vehicle, that direction is set as the fourth obstacle-containing direction DSout (DSout=right). In other words, for example, when it has been determined that another vehicle is traveling side-by-side in the right-hand lane, the right-hand direction is set as the fourth obstacle-containing direction SDout (SDout=right).

The fourth obstacle-containing direction SDout may also be ultimately determined with the condition that other vehicles and obstacles are moving at substantially the same velocity as the host vehicle velocity. For example, when it is thereby determined that another vehicle is traveling side-by-side in the right-hand lane and the velocity of the other vehicle is equal to the velocity of the host vehicle, the right-hand direction is set as the fourth obstacle-containing direction SDout (SDout=right).

When the level of risk is high in both directions as seen from the host vehicle, both directions are determined to be a fourth obstacle-containing direction SDout (SDout=both).

The presence of another vehicle or the like to the rear is detected based on the information (information regarding other vehicles and obstacles present in the rearward direction) obtained from the rear obstacle monitoring radar 36. When it has been determined that another vehicle or the like is present to the rear, the rear vehicle presence flag Frear is set to ON (Frear=ON), and when it has been determined that there are no other vehicles or the like to the rear, the rear vehicle presence flag Frear is set to OFF (Frear=OFF).

The processing of step S3 is performed as described above.

The following actions are performed in the subsequent steps S4 to S9: a determination of the lane departure tendency, a determination of the intention of the driver to change lanes, a selection of the control method, a calculation of the target yaw moment, a calculation of the departure-avoiding deceleration, and a calculation of the target brake hydraulic pressure for each wheel. The above constitutes the computational processing by the brake driving force control unit 8 in the second embodiment.

Here, the braking control method is selected in the same manner as in the first embodiment based on the rear vehicle presence flag Frear or the second to fourth obstacle-containing directions Aout, RSout, and SDout obtained in step S3. Here, the braking control method is described separately for each case.

The relationship between the departure direction Dout and the second obstacle-containing direction Aout is as follows (fourth case to sixth case).

In the fourth case, when there is no match between the departure direction Dout and the second obstacle-containing direction Aout and the departure direction Dout, the departure-avoiding yaw control is carried out when the estimated time of departure Tout becomes less than the first departure-determining threshold Ts (Tout<Ts).

In the fifth case, when there is a match between the departure direction Dout and the second obstacle-containing direction Aout, the departure-avoiding yaw control is carried out until the departure determination flag Fout is set to OFF.

The first departure-determining threshold Ts is used in the determination of the lane departure tendency in step S4 of the first embodiment, but the lane departure tendency herein is determined using a departure-determining threshold (Ts+dTs1) obtained by adding a certain setting (hereinafter referred to as "the first setting") dTs1 to the first departure-determining threshold Ts. The departure-avoiding yaw control is thereby initiated when the estimated time of departure Tout has become less than the departure-determining threshold (Ts+dTs1) (Tout<(Ts+dTs1)). The timing for initiating departure-avoiding yaw control is thereby advanced by an amount equal to the first setting dTs1.

In the sixth case, when there is a match between the departure direction Dout and the second obstacle-containing direction Aout and the departure direction Dout, the departure-avoiding deceleration control is carried out until the departure determination flag Fout is set to OFF.

Here, the lane departure tendency is determined with the departure-determining threshold (Ts+dTs1). The departure-avoiding yaw control is thereby initiated when the estimated time of departure Tout has become less than the departure-determining threshold (Ts+dTs1) (Tout<(Ts+dTs1)).

Furthermore, the lane departure tendency is determined using a certain setting (hereinafter referred to as "the second setting"). For example, the second setting dTs2 can be less than the second departure-determining threshold Tr. The departure-avoiding deceleration control is thereby carried out when the estimated time of departure Tout is less than the second setting dTs2 (Tout<dTs2). The timing for initiating the departure-avoiding yaw control can thereby be advanced by an amount equal to the first setting dTs1, and the departure-avoiding deceleration control is carried out when the estimated time of departure Tout is less than the second setting dTs2 (Tout<dTs2).

Figure 15:
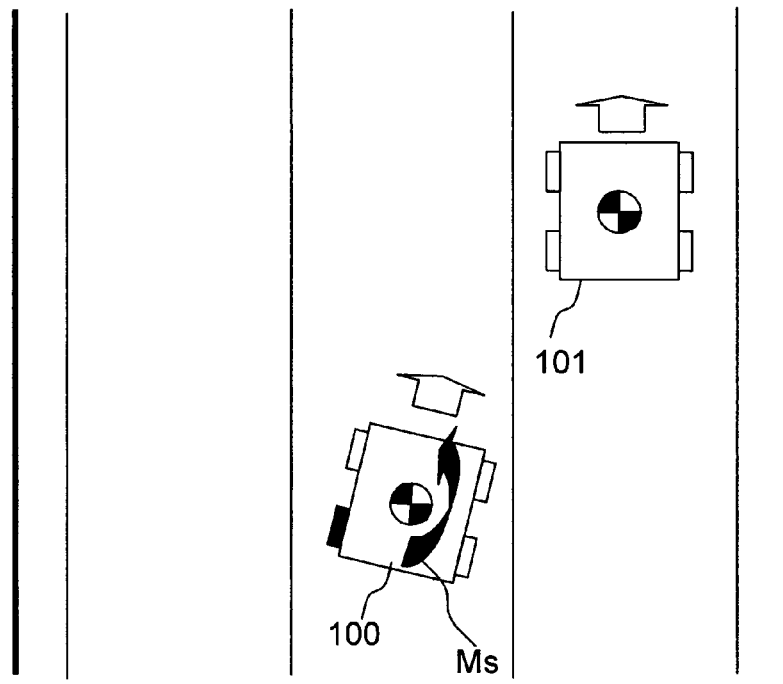
FIG. 15 is a diagram used for describing the braking control method in the fifth and sixth cases.

FIG. 15 shows vehicle behavior when departure-avoiding yaw control is performed in the fifth and sixth cases. The fifth and sixth cases are those in which there is a match between the departure direction Dout and the second obstacle-containing direction Aout. In other words, the host vehicle 100 has a departure tendency in the right-hand direction, and another vehicle 101 is present in that direction, as shown in FIG. 15. The departure-avoiding yaw control is performed in such a case. Also, the departure-avoiding yaw control used in this case operates sooner than normal timing.

The first setting dTs1, the second setting dTs2, and the deceleration by departure-avoiding deceleration control can be set based on the distance from forward obstacles or the like. For example, the distance to a forward obstacle or the like can be determined with the aid of the ACC radar 31, so the first setting dTs1, the second setting dTs2, and the deceleration are set based on the distance to a forward obstacle or the like obtained with the ACC radar 31.

For example, a shorter distance results in a greater first setting dTs1, the second setting dTs2, and the deceleration. When set in such a manner, the timing for initiating departure-avoiding yaw control is advanced. Also, a shorter distance results in a higher deceleration being induced by departure-avoiding deceleration control.

The relationship between the departure direction Dout and the third obstacle-containing direction RSout is described next (seventh and eight cases).

In the seventh case, when there is no match between the departure direction Dout and the third direction with an obstacle RSout, the departure-avoiding yaw control is performed when the estimated time of departure Tout is less than the first departure-determining threshold Ts (Tout<Ts).

In the eighth case, when there is a match between the departure direction Dout and the third direction with an obstacle RSout, the departure-avoiding yaw control is performed until the departure determination flag Fout is set to OFF.

The first departure-determining threshold Ts is used in the determination of the lane departure tendency in step S4 of the first embodiment, but the lane departure tendency herein is determined with the aid of a departure-determining threshold (Ts+dTs3) obtained by adding a certain setting (hereinafter referred to as "the third setting") dTs3 to the first departure-determining threshold Ts. The departure-avoiding yaw control is thereby initiated when the estimated time of departure Tout has become less than the departure-determining threshold (Ts+dTs3) (Tout<(Ts+dTs3)). The timing for initiating the departure-avoiding yaw control is thereby advanced by an amount equal to the third setting dTs3.

The target yaw moment Ms is calculated in step S7 with Equation (3). Here, the gains K1 and K2 can be set to different values in Equation (3). For example, gain K1 is set to gain (K1+dK1), and gain K2 is set to gain (K2+dK2). Here, the terms dK1 and dK2 are predetermined values for changing the gains K1 and K2. The departure-avoiding yaw control, which is derived from the target yaw moment Ms obtained with the aid of the gains (K1+dK1) and (K2+dK2), is thereby initiated when the estimated time of departure Tout has become less than the departure-determining threshold (Ts+dTs3) (Tout<(Ts+dTs3)).

When the target moment Ms is changed to a large value in this manner, the setting of the target yaw moment Ms can be limited with a maximum value Mmax. In other words, even if the predetermined values dK1 and dK2 have been set in accordance with certain conditions, the target yaw moment Ms is set to the maximum value Mmax without relation to the predetermined values dK1 and dK2 if the target yaw moment Ms obtained with the aid of the predetermined values dK1 and dK2 exceeds the maximum value Mmax. Also, the departure-avoiding deceleration control is not carried out in the seventh and eighth cases.

Figure 16:
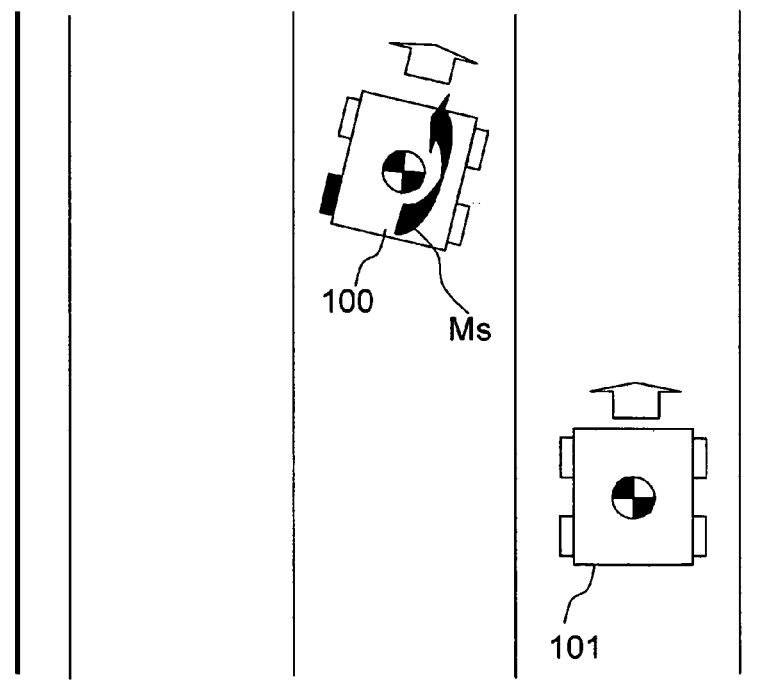
FIG. 16 is a diagram used for describing the braking control method in the eighth case.

FIG. 16 shows vehicle behavior when departure-avoiding yaw control is performed in the eighth case. The eighth case is one in which there is a match between the departure direction Dout and the third obstacle-containing direction Sout. In other words, it is a case in which the host vehicle 100 has a lane departure tendency in the right-hand direction, and another vehicle 101 is present in the neighboring right-hand lane trailing the host vehicle 100, as shown in FIG. 16. The departure-avoiding yaw control is performed in such a case. Also, the departure-avoiding yaw control in this case operates sooner than normal timing, and the yaw moment imparted to the host vehicle operates with a magnitude that is larger by an amount equal to the values dK1 and dK2.

The relationship between the departure direction Dout and the fourth obstacle-containing direction SDout is described next (ninth and tenth cases).

In the ninth case, when there is a match between the departure direction Dout and the fourth obstacle-containing direction SDout, the departure-avoiding yaw control is performed when the estimated time of departure Tout is less than the first departure-determining threshold Ts (Tout<Ts).

In the tenth case, when there is a match between the departure direction Dout and the fourth obstacle-containing direction SDout, the departure-avoiding yaw control is performed until the departure determination flag Fout is set to OFF.

The first departure-determining threshold Ts is used in the determination of the lane departure tendency in step S4 of the first embodiment, but the lane departure tendency herein is determined with the aid of a departure-determining threshold (Ts+dTs4) obtained by adding a certain setting (hereinafter referred to as "the fourth setting") dTs4 to the first departure-determining threshold Ts. The departure-avoiding yaw control is thereby initiated when the estimated time of departure Tout has become less than the departure-determining threshold (Ts+dTs4) (Tout<(Ts+dTs4)). The timing for initiating departure-avoiding yaw control is thereby advanced by an amount equal to the fourth setting dTs4.

The departure-avoiding deceleration control can also be performed when the estimated time of departure Tout is less than the first departure-determining threshold Ts. In this configuration, the departure-avoiding yaw control is initiated, after which departure-avoiding deceleration control intervenes with a predetermined timing.

Figure 17:
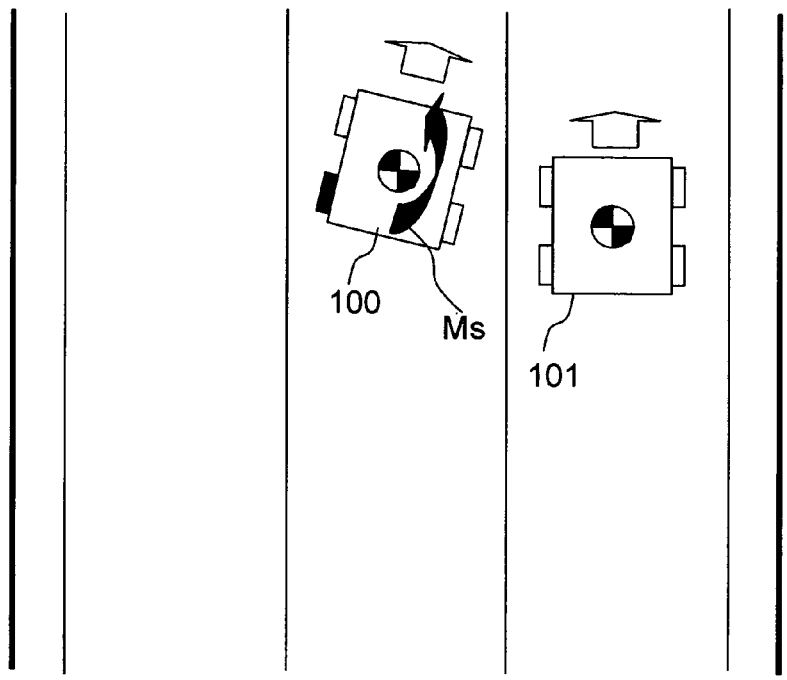
FIG. 17 is a diagram used for describing the braking control method in the tenth case.

FIG. 17 shows vehicle behavior when the departure-avoiding yaw control is performed in the tenth case. The tenth case is one in which there is a match between the departure direction Dout and the fourth obstacle-containing direction SDout. In other words, the host vehicle 100 has a lane departure tendency in the right-hand direction, and another vehicle 101 is present in the neighboring right-hand lane traveling parallel to the host vehicle 100, as shown in FIG. 17. The departure-avoiding yaw control is performed in such a case. Also, the departure-avoiding yaw control in this case operates sooner than normal timing.

The braking control method performed based on the rearward vehicle presence flag Frear is described next (eleventh case).

In the eleventh case, when the rearward vehicle presence flag Frear is ON, in other words, when a rearward vehicle or the like has been detected, the lane departure tendency is determined with the aid of a departure-determining threshold (Ts+dTs5) obtained by adding a certain setting (hereinafter referred to as "the fifth setting") dTs5 to the first departure-determining threshold Ts. The departure-avoiding yaw control is thereby initiated when the estimated time of departure Tout has become less than the departure-determining threshold (Ts+dTs5) (Tout<(Ts+dTs5)). The timing for initiating the departure-avoiding yaw control is thereby advanced by an amount equal to the fourth setting dTs5.

Figure 18:
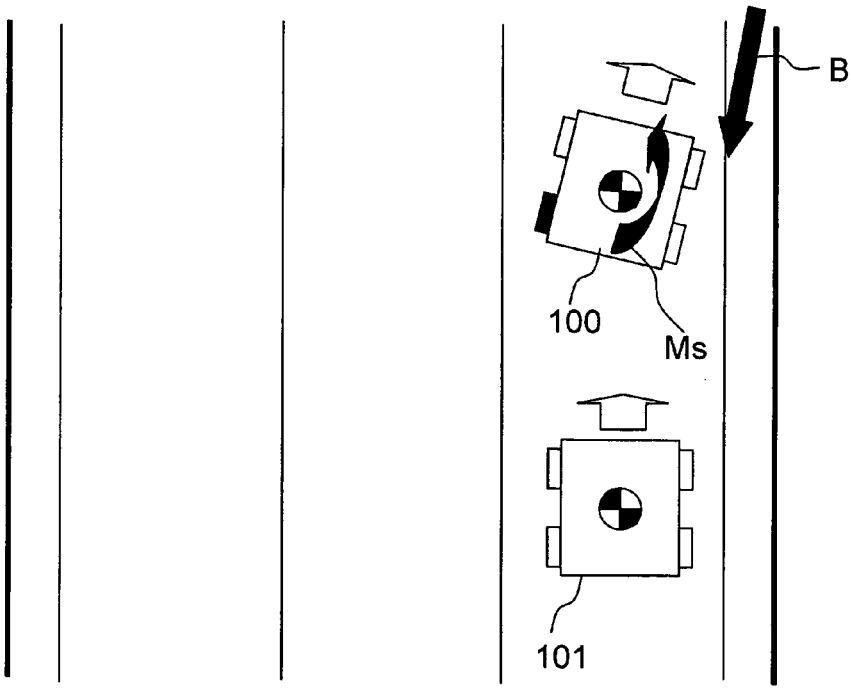
FIG. 18 is a diagram used for describing the braking control method in the eleventh case.

FIG. 18 shows vehicle behavior when the departure-avoiding yaw control is performed in the eleventh case. When the rearward vehicles or the like have been detected, the departure-avoiding yaw control is caused to operate early, as shown in FIG. 18. In this example, the departure-avoiding deceleration control is also performed because the shoulder of the road is in the departure direction (first obstacle-containing direction Sout=right).

The target brake hydraulic pressure Psi (i=fl, fr, rl, rr) for each wheel is selected in the same manner as in the first embodiment. In other words, the target brake hydraulic pressure Psi (i=fl, fr, rl, rr) for each wheel is calculated so as to perform the braking control method in the fourth to eleventh cases. The calculated target brake hydraulic pressure Psi (i=fl, fr, rl, rr) for each wheel is output to the brake hydraulic pressure control unit 7 as a brake hydraulic pressure command value. In the brake hydraulic pressure control unit 7, the brake hydraulic pressure for the wheel cylinders 6FL to 6RR is individually controlled based on the brake hydraulic pressure command value.

Next, the effects of the second embodiment are described.

As described above, the departure-avoiding yaw control is performed based on the presence of vehicles and obstacles in the area. In the first embodiment, normal departure-avoiding control is carried out when, for example, the center lane of a three-lane, one-way road is being traveled. On the other hand, the departure-avoiding in the second embodiment is carries out by a departure-avoiding control procedure in which the driving environment of the host vehicle is taken into consideration so that it can be performed even when the center lane of a three-lane, one-way road is being traveled. In particular, the departure-avoiding in the second embodiment is conducted by performing the departure-avoiding yaw control based on the presence of vehicles and obstacles in the area.

As described above, the timing for initiating departure-avoiding yaw control is advanced when other vehicles are traveling in front, beside, rear lateral, and behind; i.e., when there are vehicles traveling in the area. The host vehicle can thereby avoid departure early and the running behavior of the host vehicle can be prevented from being an annoyance to the drivers of the other running vehicles.

As described above, as long as there are no special circumstances, such as departure from the driving lane and off the road, the departure-avoiding deceleration control is not performed when another running vehicle is present in the rearward direction (this case includes the rear lateral direction as well). The possibility of a trailing vehicle coming into contact with the host vehicle increases when departure-avoiding deceleration control operates to avoid departure. However, the trailing vehicle can be prevented from coming into contact with the host vehicle by dispensing with departure-avoiding deceleration control even when departure avoidance is required.

The amount of deceleration resulting from departure-avoiding deceleration control can be reduced when another running vehicle is present in the rearward direction (this case includes the rear lateral direction as well). In this case, the same effect can be obtained. In other words, when another running vehicle is present in the rearward direction, the trailing vehicle can be prevented from coming into contact with the host vehicle if departure-avoiding deceleration control is restrained.

As described above, if the timing for initiating departure-avoiding yaw control is advanced when another running vehicle is present rearward or rear laterally, the departure-avoiding control can be completed early. As a result, intervention by the departure-avoiding deceleration control after the departure-avoiding yaw control can thereby be eliminated. In view of the above, when another running vehicle is present rearward or rear laterally, advancing the timing for initiating departure-avoiding yaw control also leads to preventing contact between the host vehicle and other running vehicles.

Third Embodiment

A lane departure prevention apparatus in accordance with a third embodiment will now be explained. The configuration of the host vehicle of the third embodiment is the same as the configuration of the host vehicle of the second embodiment (see, FIG. 14). In other words, in the second embodiment, the direction is determined based on the risk level in accordance with the presence or absence of vehicles or obstacles directly behind the host vehicle or behind and to the side of the host vehicle, and the braking control method based on the departure-avoiding yaw control and the departure-avoiding deceleration control is selected based on the determination results. In the third embodiment, the braking control method is selected by additionally taking into consideration the relative velocity and other positional relationships with respect to other vehicles or the like. In view of the similarity between the second and third embodiments, the descriptions of the parts or steps of the third embodiment that are identical to the parts or steps of the prior embodiments may be omitted for the sake of brevity.

When there is a trailing vehicle, the departure-avoiding deceleration control is selected based on the time to collision TTC (Time To Collision) with the trailing vehicle. Here, the time to collision TTC is a value obtained by dividing the relative velocity between the host vehicle and the trailing vehicle by the velocity of the host vehicle, and is an indicator showing that the trailing vehicle may collide with the host vehicle in so many seconds at the current relative velocity.

Figure 19:
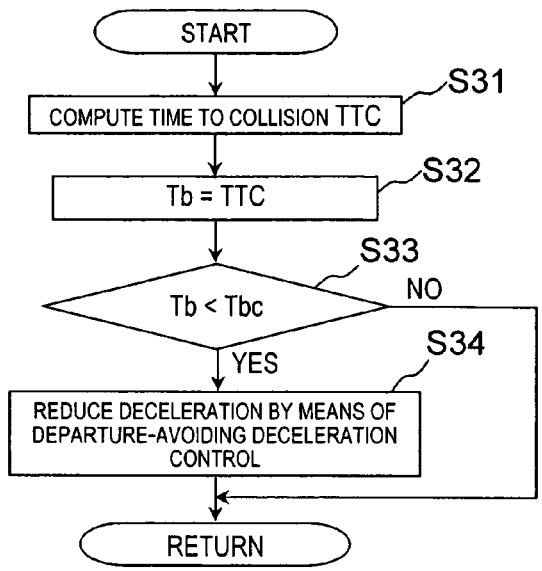
FIG. 19 describes a third embodiment of the present invention, and is a flowchart showing the processing content of the brake driving force control unit when a trailing vehicle is present.

When the time to collision TTC is less than a predetermined length of time, deceleration of the host vehicle by departure-avoiding deceleration control is reduced. FIG. 19 shows the processing procedure for bringing about this outcome. The processing is carried out by the brake driving force control unit 8.

First, the time to collision TTC is calculated in step S31. More specifically, the relative velocity is calculated based on the distance between the trailing vehicle and the host vehicle as measured by the rear obstacle monitoring radar 36, and the time to collision TTC is calculated based on the calculated relative velocity.

The rear obstacle monitoring radar 36 can be configured so as to perform a series of processing tasks from measuring the distance between the trailing vehicle and the host vehicle to calculating the time to collision TTC. In this case, the rear obstacle monitoring radar 36 will have a computational processing function that is capable of any type of computation.

In the subsequent step S32, the time to collision Tb of the trailing vehicle is given the value of the time to collision TTC calculated in step S31.

In the subsequent step S33, the time to collision Tb of the trailing vehicle and a predetermined threshold Tbc are compared. Here, when the time to collision Tb of the trailing vehicle is less than the predetermined threshold Tbc, the processing advances to step S34, and when the time to collision Tb of the trailing vehicle is equal to or greater than the predetermined threshold Tbc, the system skips the processing shown in FIG. 19.

In step S34, the deceleration of the host vehicle due to departure-avoiding deceleration control is reduced. The deceleration of the host vehicle due to the departure-avoiding deceleration control can be reduced as follows, for example.

The target brake hydraulic pressure Pgf for departure avoidance is calculated in step S8, and this target brake hydraulic pressure Pgf for departure avoidance is changed using Equation (13) below.

$$Pfg = Pfg \times \alpha \quad (13)$$

In the Equation (13), the term $\alpha$ is a coefficient that has a value between 0 and 1, for example ($0<\alpha<1$). For example, the value of the coefficient $\alpha$ is selected based on the time to collision Tb of the trailing vehicle. More specifically, the shorter the time to collision Tb of the trailing vehicle, the value of the coefficient $\alpha$ becomes smaller. The target brake hydraulic pressure Pgr for the rear wheels is also calculated based on the target brake hydraulic pressure Pgf for the front wheels while taking the front and back distribution into consideration.

The changing of such target brake hydraulic pressures Pgf and Pgr is decided at the same time that the braking control method is selected in step S6.

The above is a description of the processing procedure shown in FIG. 19. If there is a trailing vehicle, this processing allows the deceleration of the host vehicle by the departure-avoiding deceleration control to be reduced when the time to collision TTC is shorter than a predetermined length of time. The shorter the time to collision TTC, the smaller the deceleration can be made.

For example, even when departure-avoiding deceleration is being performed because the shoulder of the road is in the departure direction, as shown in FIG. 18, the deceleration of the host vehicle due to the departure-avoiding deceleration control can be reduced in accordance with the time to collision TTC when there is a trailing vehicle.

The braking control method that is used when a vehicle is in the rear lateral direction from the host vehicle is described next.

When there is a vehicle in the rear lateral direction of the host vehicle, the timing for initiating the departure-avoiding control is decided based on the time to collision TTC with the host vehicle. Here, the time to collision TTC is a value obtained by dividing the relative velocity between the host vehicle and the host vehicle in a rear lateral direction by the velocity of the host vehicle, and is an indicator showing that there the host vehicle in a rear lateral direction may collide with the host vehicle in so many seconds at the current relative velocity.

Figure 20:
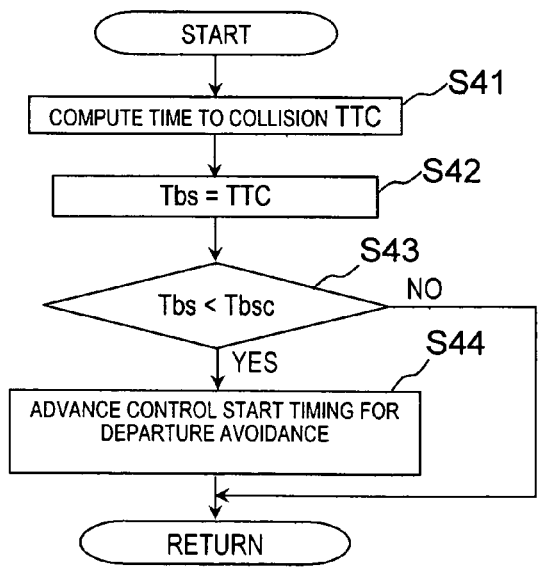
FIG. 20 describes the third embodiment of the present invention, and is a flowchart showing the processing content of the brake driving force control unit when a vehicle is present in the rear lateral direction.

Here, because the host vehicle that is in the left-neighboring lane or the right-neighboring lane of the driving lane of the host vehicle is the object of focus, the time to collision TTC is an indicator showing, in seconds, when the host vehicle in a rear lateral direction will arrive at the same position (lateral position of the host vehicle) as the host vehicle at the current relative velocity. When such a time to collision TTC is shorter than the predetermined length of time, the timing for initiating the departure-avoiding control is advanced. FIG. 20 shows the processing procedure for bringing about this outcome. The processing is carried out by the brake driving force control unit 8.

First, the time to collision TTC is calculated in step S41. More specifically, the relative velocity is calculated based on the distance between the host vehicle in a rear lateral direction and the host vehicle measured by the rear lateral obstacle monitoring radars 32 and 33, and the time to collision TTC is calculated based on the calculated relative velocity.

The rear lateral obstacle monitoring radars 32 and 33 can be configured so as to perform a series of processing tasks from measuring the distance between vehicle in the rear lateral vehicle and the host vehicle to calculating the time to collision TTC. In this case, the rear lateral obstacle monitoring radars 32 and 33 will have a computational processing function that is capable of any type of computation.

In the subsequent step S42, the time to collision TTC calculated in step S41 is set as the time to collision Tbs of the rear lateral vehicle.

In the subsequent step S43, the time to collision Tbs of the rear lateral vehicle and a predetermined threshold Tbsc are compared. Here, when the time to collision Tbs of the rear lateral vehicle is less than the predetermined threshold Tbsc, the processing advances to step S44, and when the time to collision Tbs of the rear lateral vehicle is equal to or greater than the predetermined threshold Tbsc, the system skips the processing shown in FIG. 20.

In step S44, the timing for initiating the departure-avoiding control is advanced. In step S4, the estimated time of departure Tout and the predetermined first departure-determining threshold Ts are compared to determine the departure tendency, and the first departure-determining threshold Ts is changed to Tshigh (>Ts), for example.

Described below is the processing procedure shown in FIG. 20. When there is vehicle in the rear lateral direction of the host vehicle, the timing for initiating the departure-avoiding control can be advanced when the time to collision TTC is shorter than a predetermined length of time.

When there is a vehicle in the rear lateral direction of the host vehicle, the timing for initiating the departure-avoiding control can be advanced in accordance with the time to collision TTC. In other words, the timing for actuating the departure-avoiding yaw control and the departure-avoiding deceleration control for avoiding departure can be advanced.

Next, the effects of the third embodiment are described.

As described above, when a trailing vehicle is present, deceleration of the host vehicle by the departure-avoiding deceleration control is reduced. The deceleration is thereby reduced even when the departure-avoiding deceleration control for avoiding departure is engaged. Hence, the trailing vehicle can be prevented from coming into contact with the host vehicle even when the departure-avoiding deceleration control for avoiding departure is engaged in the presence of the trailing vehicle.

Furthermore, the magnitude of the deceleration is decided based on the time to collision TTC and other relative positional relationships between the trailing vehicle and the host vehicle. An optimal deceleration can thereby be set based on the relative positional relationships between the trailing vehicle and the host vehicle. For example, the approach of the trailing vehicle to the host vehicle can be effectively prevented if deceleration is further reduced when the rate of approach of the trailing vehicle to the host vehicle is high. Because deceleration is decided in each circumstance from the relative positional relationship between the host vehicle and the trailing vehicle, deceleration does not become unnecessarily large, so the driver can be prevented from feeling annoyance at the operation of the departure-avoiding deceleration control for avoiding departure.

As described above, when a vehicle is present in the rear lateral direction of the host vehicle, the timing for initiating the departure-avoiding control can be advanced. The host vehicle can thereby be prevented from departure at an early stage.

Also, the presence or absence of a change in the timing for initiating departure-avoiding braking is decided based on the time to collision Tbs of the rear lateral vehicle, that is to say, the relative positional relationship between the host vehicle and the host vehicle in a rear lateral direction. In other words, the presence or absence of a change in the timing for initiating braking for each circumstance is decided from the relative positional relationship between the host vehicle and the host vehicle in a rear lateral direction. The driver can be prevented from feeling annoyance at the operation of the departure-avoiding braking control, because the timing for initiating braking is not started unnecessarily early.

Fourth Embodiment

A lane departure prevention apparatus in accordance with a fourth embodiment will now be explained. The configuration of the host vehicle of the fourth embodiment is the same as the configuration of the host vehicle of the first embodiment (refer to FIG. 1). In the fourth embodiment, the processing content of the brake driving force control unit 8 is different from the first embodiment. Unless mentioned otherwise, other configurations of the host vehicle of the fourth embodiment are the same as the configuration of the first embodiment. In view of the similarity between the first and fourth embodiments, the parts or steps of the fourth embodiment that are identical to the parts or steps of the first embodiment will be given the same reference numerals as the parts or steps of the first embodiment. Moreover, the descriptions of the parts or steps of the fourth embodiment that are identical to the parts of the first embodiment may be omitted for the sake of brevity.

Figure 21:
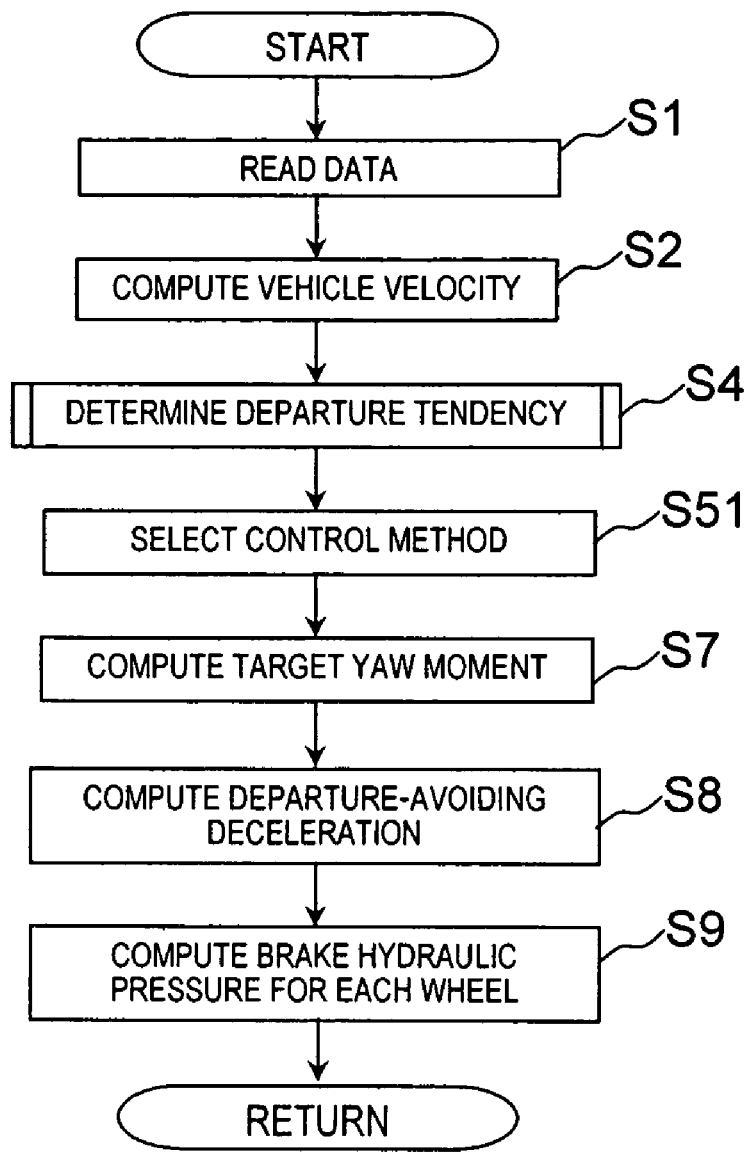
FIG. 21 describes a fourth embodiment of the present invention, and is a flowchart showing the processing content of the brake driving force control unit.

The computational processing procedure carried out in the brake driving force control unit 8 is shown in FIG. 21. The computational processing procedure is substantially the same as the computational processing procedure of the first embodiment, and the portions that differ in particular will be described.

In other words, in steps S1, S2, and S4, various data is read, the host vehicle velocity is calculated, and the lane departure tendency is determined in the same manner as in the first embodiment. After step S4, the system advances to step S51, which is described below.

Unlike in the first embodiment, the fourth embodiment dispenses with determining the driving environment in step S3 (the determination of the first obstacle-containing direction Sout) or determining the driver intention to change lanes in step S5 (the setting of the departure determination flag Fout based on the turn switch signal). For example, because no processing is thereby performed for setting (changing) the departure determination flag Fout based on the turn switch signal in step S5, the condition of the departure determination flag Fout that was set in step S4 of previous processing is kept unchanged until the processing in FIG. 19 is completed.

In other words, the estimated time of departure Tout and the predetermined first departure-determining threshold Ts are compared, and when the estimated time of departure Tout is less than the first departure-determining threshold Ts (Tout<Ts), the departure determination flag Fout is kept ON (Fout=ON). Also, when the estimated time of departure Tout is equal to or greater than the first departure-determining threshold Ts (Tout≧Ts), the departure determination flag Fout is kept OFF (Fout=OFF).

The control method for departure avoidance is selected in step S51 of FIG. 21. More specifically, it is selected whether or not to issue a departure alarm and to perform the departure-avoiding braking control, and the braking control method is selected when the departure-avoiding braking control is to be performed. This determination processing is a processing unique to the fourth embodiment. This will be described hereinafter.

Performed in the subsequent steps S7 to S9 is a calculation of the target yaw moment, calculation of the departure-avoiding deceleration, and calculation of the target brake hydraulic pressure for each wheel. The target brake hydraulic pressure Psi (i=fl, fr, rl, rr) for each wheel is output to the brake hydraulic pressure control unit 7 as a brake hydraulic pressure command value.

Following is a description of the processing for selecting the braking control method in step S51, which is processing unique to the fourth embodiment (twelfth case).

In the twelfth case, the braking control is configured so as to impart yaw moment to the host vehicle when the lateral displacement X is equal to or greater than a predetermined value Xs, i.e., when the host vehicle is traveling on the very edge within the driving lane, or when the host vehicle is traveling along the white line, even in a case in which the estimated time of departure Tout is equal to or greater than the first departure threshold Ts (Tout≧Ts).

The first to third embodiments are designed such that, as a rule, the departure-avoiding control is not performed when the estimated time of departure Tout is equal to or greater than the first departure-determining threshold Ts. However, in this fourth embodiment braking control is performed so as to impart yaw moment to the host vehicle with the condition that the lateral displacement X is equal to or greater than the predetermined value Xs even when the estimated time of departure Tout is equal to or greater than the first departure threshold Ts.

Figure 22:
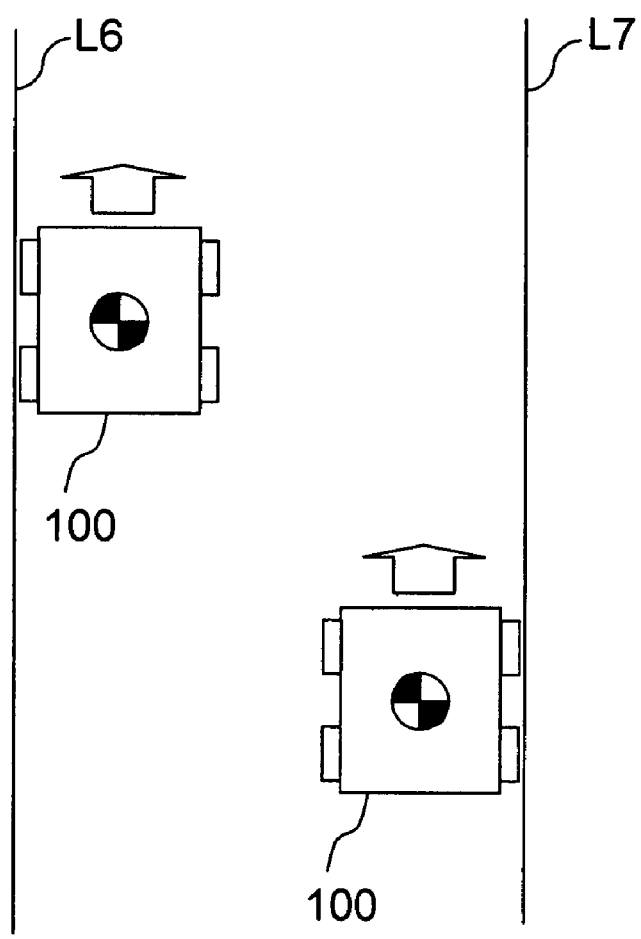
FIG. 22 is a diagram showing the state of a vehicle traveling along a white line.

FIG. 22 shows the case in which the host vehicle 100 is traveling on the very edge within the driving lane, that is, along the white line Ll6 or Ll7. In such a case, braking control is performed so that yaw moment is imparted to the host vehicle 100.

In this case, the target yaw moment Ms is set to a value that is less than that designed for departure avoidance. For example, in step S7, the target yaw moment Ms is calculated with Equation (3), but the target yaw moment Ms is set to a small value by changing the gain K1 in Equation (3) to K1' (<K1).

Figure 23:
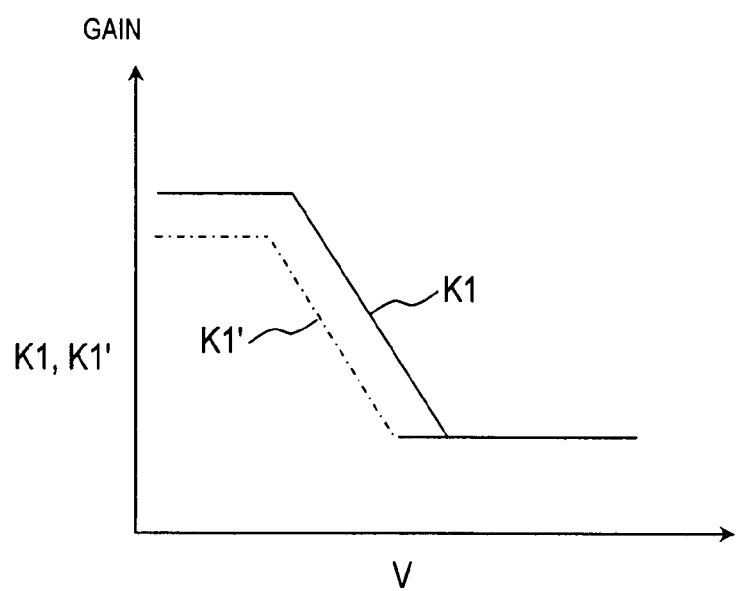
FIG. 23 is a characteristics diagram showing the characteristics of gains K1 and K1' that are used for calculating the yaw moment Ms.

FIG. 23 shows an example of the gains K1 and K1' to be used. The gains K1 and K1' are large values in a low velocity range, decrease in a corresponding relationship with the host vehicle velocity V when the host vehicle velocity V reaches a certain value, and then remain constant when a certain vehicle velocity V is reached, as shown in FIG. 23.

The braking control method is selected in this manner in step S51. The target brake hydraulic pressure Psi (i=fl, fr, rl, rr) for each wheel is calculated in step S9 so as to carry out the braking control method, and the calculated target brake hydraulic pressure Psi (i=fl, fr, rl, rr) is output to the brake hydraulic pressure control unit 7 as a brake hydraulic pressure command value. In the brake hydraulic pressure control unit 7, the brake hydraulic pressure for the wheel cylinders 6FL to 6RR is individually controlled based on the brake hydraulic pressure command value.

Unlike the first embodiment, the fourth embodiment dispenses with determining the driving environment in step S3 (determination of the first obstacle-containing direction Sout) or determining the driver intention to change lanes in step S5 (setting of the departure determination flag Fout on the basis the turn switch signal) for the host vehicle, so providing a steering angle sensor 19 and obtaining a turn switch signal from the turn signal switch 20 need not be required conditions.

Next, the effects of the fourth embodiment are described.

As described above, when the host vehicle is traveling on the very edge within a driving lane, the yaw moment is imparted to the host vehicle. For example, when the host vehicle is traveling on the very edge within the driving lane, the presence of the host vehicle gives a feeling of anxiety to the driver of the host vehicle traveling in the neighboring lane. Also in this case, the possibility of host vehicle and the host vehicle traveling in the neighboring lane coming into contact is high.

In view of the above, the driver can be notified of the fact that the host vehicle is traveling on the very edge within the driving lane and the driver can be urged to travel in the center of the lane by imparting yaw moment to the host vehicle when the host vehicle is traveling on the very edge within the driving lane.

Such a notification can be prevented from being an annoyance to the driver by making the yaw moment imparted to the host vehicle at this time smaller than that for departure avoidance. Furthermore, due to the difference in the magnitude imparted, a distinction can be made to inform the driver as to whether the imparting of yaw moment (turning) is for departure avoidance or for notification that the host vehicle is traveling on the very edge within the driving lane. Discomfort and annoyance due to yaw control can thereby be reduced.

Fifth Embodiment

Figure 24:
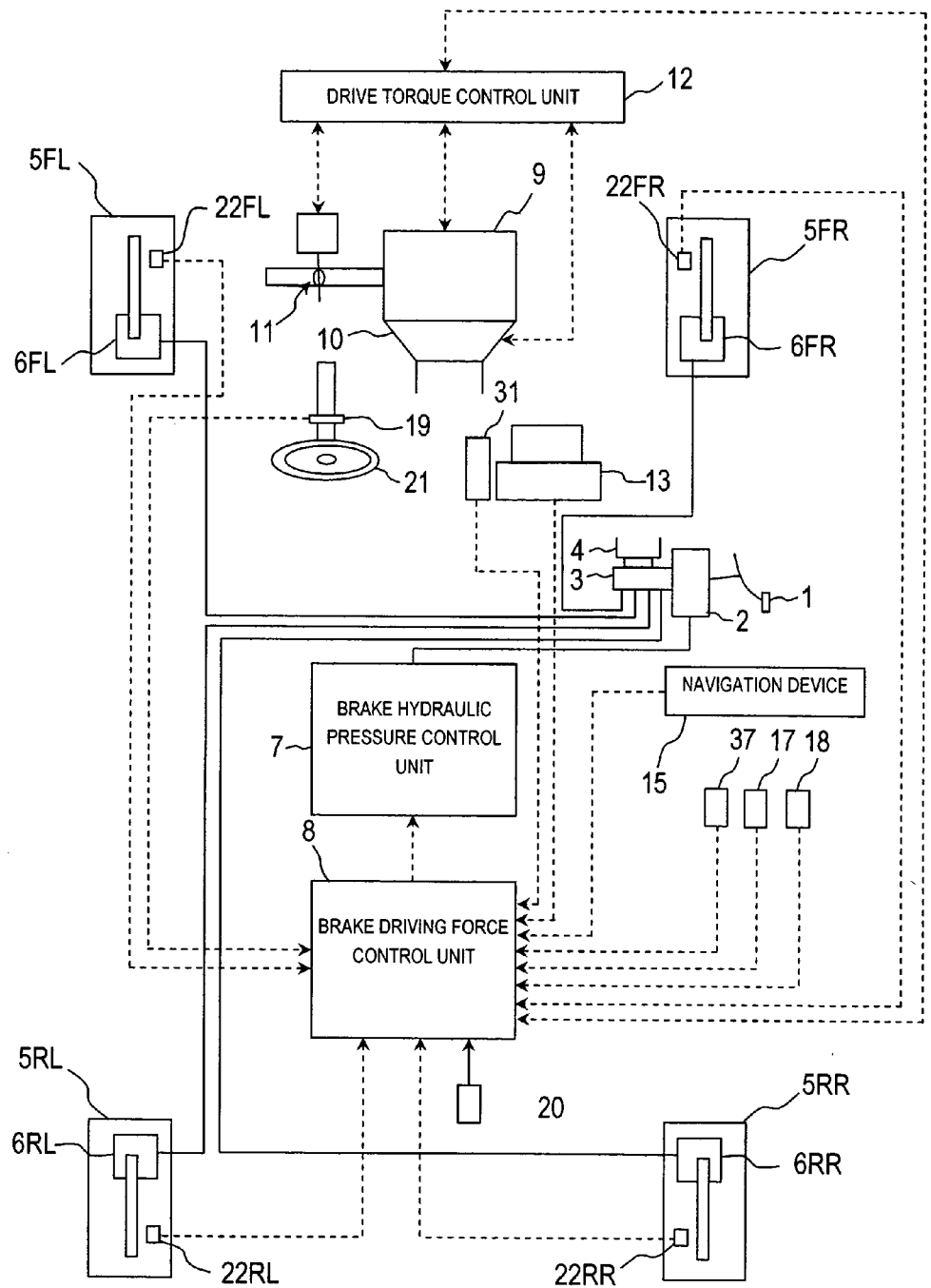
FIG. 24 is a schematic structural diagram showing a fifth embodiment of a vehicle equipped with the lane departure prevention apparatus of the present invention.

Referring now to FIG. 24, a lane departure prevention apparatus in accordance with a fifth embodiment will now be explained. As shown in FIG. 24, the host vehicle of the fifth embodiment has the same configuration of the host vehicle of the first embodiment but further comprises an ACC radar 31 and a system-operating switch 37. Unless mentioned otherwise, other configurations of the host vehicle of the second embodiment are the same as the configuration of the first embodiment. In view of the similarity between the first and fifth embodiments, the parts or steps of the fifth embodiment that are identical to the parts or steps of the first embodiment will be given the same reference numerals as the parts of the first embodiment. Moreover, the descriptions of the parts or steps of the fifth embodiment that are identical to the parts or steps of the first embodiment may be omitted for the sake of brevity.

In the fifth embodiment, the ACC radar 31 is configured and arranged to obtain information about vehicles or obstacles in the forward direction in the lanes adjacent to the host vehicle lane, as described the second embodiment. More specifically, the ACC radar 31 obtains information about the presence or absence of vehicles or the like in the forward direction, and information about the relative distances Lfr and the relative velocities Vfr to vehicles or the like in the forward direction. With the ACC radar 31, the presence or absence of forward vehicles or the like is output to the brake driving force control unit 8, and the relative distances Lfr and the relative velocities Vfr.

The system-operating switch 37 is a switch for enabling or disabling the operation of the departure-avoiding system. As described in the embodiments above, the system is built such that control performed by the brake driving force control unit 8 is used to avoid situations in which the host vehicle departs from the driving lane when the host vehicle has a tendency to depart from the driving lane. The driver can enable such a departure-avoiding system to operate by turning the system-operating switch 37 to the ON position, and can disable the departure-avoiding system by turning the system-operating switch 37 to the OFF position.

Figure 25:
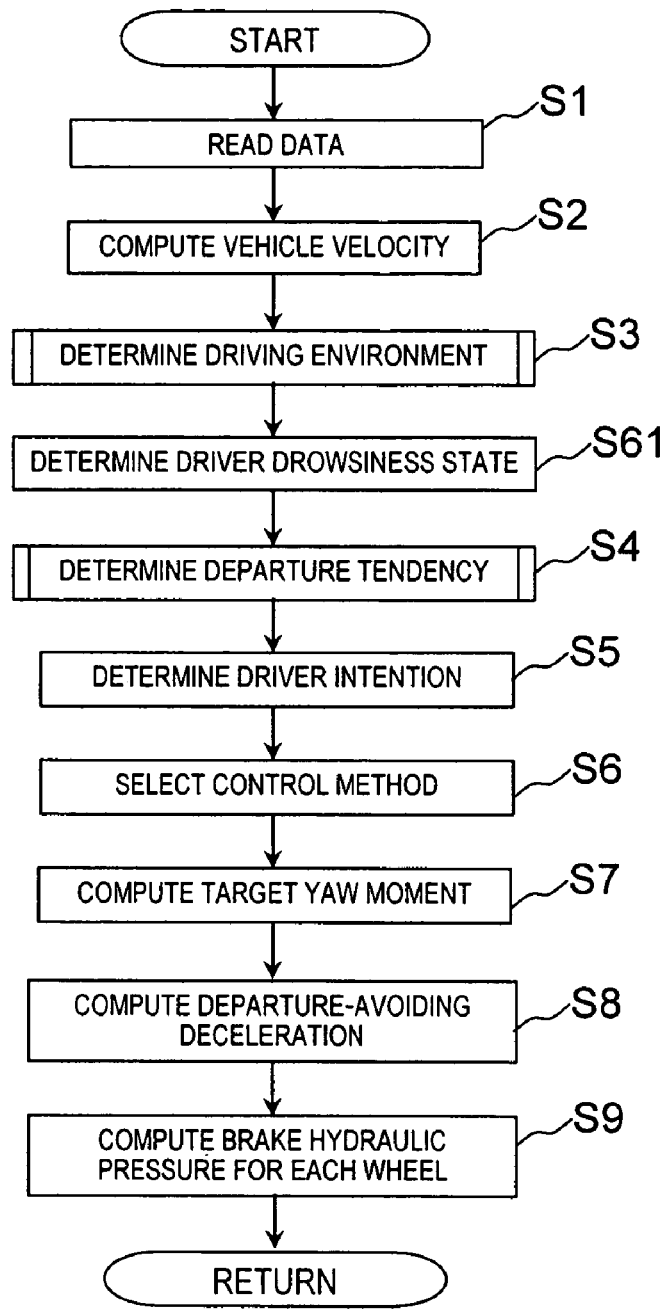
FIG. 25 is a flowchart showing the processing content of the brake driving force control unit in the fifth embodiment.

In the fifth embodiment, the processing content of the brake driving force control unit 8 is different from the first embodiment. The computational processing procedure carried out in the fifth embodiment in the brake driving force control unit 8 is shown in FIG. 25. The computational processing procedure is substantially the same as the computational processing procedure of the first embodiment, and the portions that differ in particular will be described.

In other words, in steps S1, S2, and S3, various data is read, vehicle velocity is calculated, and the driving environment is determined in the same manner as in the first embodiment. After step S3, the system advances to the step S61 described below.

A determination is made in step S61 as to whether a state exists in which the driver has no driving intent (state of drowsiness) to make a lane changed. More specifically, a determination is made as to whether the driver has no driving intent by determining whether the driver is intentionally pressing down on the accelerator or not.

In other words, first, a fixed time $\Delta T$drowsiness is set, and a throttle aperture $\theta t$ detected by the throttle aperture sensor 18 is obtained at each set time $\Delta T$drowsiness. The value of the difference between the throttle aperture $\theta ti$ at a certain point in time and the throttle aperture $\theta ti+1$ after the set time $\Delta T$drowsiness is determined using a determination value $\theta$const.

Here, if Equation (14) below is satisfied, it is determined that the size of the throttle aperture is constant.

$$\theta ti+1 - \theta ti \leq \theta const \quad (14)$$

Furthermore, the value of the difference between the throttle aperture $\theta ti+1$ and the throttle aperture $\theta ti+2$ after the set time $\Delta T$drowsiness is determined using the determination value $\theta$const.

Here, if a relationship such as that shown in Equation (15) below is obtained a fixed number of times Ndrowsiness, it is determined the driver has no driving intent (is drowsy).

$$\theta ti+2 - \theta ti+1 \leq \theta const \quad (15)$$

For example, if Ndrowsiness is 3, then the following equations are satisfied.

$$\theta ti+2 - \theta ti+1 \leq \theta const$$

$$\theta ti+3 - \theta ti+2 \leq \theta const$$

$$\theta ti+4 - \theta ti+3 \leq \theta const$$

Here, when a relationship such as that shown in Equation (15) has been obtained a fixed number of times Ndrowsiness, the driver drowsiness state determination flag Fdrowsiness is set to ON (Fdrowsiness=ON).

In other words, it is determined that the driver has no driving intent during the time Tdrowsiness given by Equation (16) below if the throttle aperture size $\theta ti$ is equal to or less than $\theta$const.

$$T\text{drowsiness} = \Delta T\text{drowsiness} \times N\text{drowsiness} \quad (16)$$

Furthermore, when the driver drowsiness state determination flag Fdrowsiness is ON and the departure determination flag Fout described hereinafter continues to be ON for a fixed number of times, Ndrowsiness is reduced. As used herein, the phrase "continues for a fixed number of times" refers to cases in which the condition continues for a fixed number of times within the shortest predetermined length of time, for example.

When the driver drowsiness state determination flag Fdrowsiness is ON and the departure determination flag Fout continues to be ON for a fixed number of times, the set time ΔTdrowsiness can be reduced and the time for determining drowsiness may be shortened.

Here, the values of Ndrowsiness and ΔTdrowsiness are predetermined thresholds for determining that the driver has no driving intent, so when the driver state determination flag Fdrowsiness continues to be ON for a fixed number of times, determining the absence of a driving intent on the part of the driver can be made easier by reducing the values of Ndrowsiness and ΔTdrowsiness.

When an adaptive cruise control (above-described ACC) system implemented by automatic cruise control is operating, it cannot be detected whether the driver operates the accelerator because the driver is relying on the system. Here, if accelerator operation cannot be detected, then the throttle aperture θti can be maintained at 0. In this case, it is difficult to determine by the throttle aperture θti whether the driver has no driving intent. In this case, the driver drowsiness state determination flag Fdrowsiness is set with reference to the departure determination flag Fout in the step S5 described below.

The driving intent of the driver is determined in step S61 as described above. Next, the lane departure tendency is determined in step S4, and the intention of the driver to change lanes is determined in step S5 in the same manner as in the above-described first embodiment.

First, the same processing as in the above-described first embodiment is carried out. In other words, when the direction (lighted blinker side) indicated by the turn switch signal and the direction indicated by departure direction Dout obtained in step S4 are the same, it is determined that the driver is intentionally changing lanes, and the departure determination flag Fout is changed to OFF (Fout=OFF). In other words, the determination result is changed, indicating that departure will not occur. When the direction (lighted blinker side) indicated by the turn switch signal and the direction indicated by departure direction Dout obtained in step S4 are different, the departure determination flag Fout is maintained, and the departure determination flag Fout is left ON (Fout=ON). In other words, the determination result is maintained, indicating that departure will occur. When the turn signal switch 20 has not been operated, the intention of the driver to change lanes is determined based on the steering angle δ. In other words, in the case that the driver steers in the departure direction, it is determined that the driver is intentionally changing lanes when the steering angle δ and the amount of variation Δδ (amount of variation per unit time) in the steering angle are equal to or greater than a set value, and the departure determination flag Fout is changed to OFF (Fout=OFF).

As processing that is unique to the fifth embodiment, the driver drowsiness state determination flag Fdrowsiness is finally decided having taken the departure determination flag Fout into consideration.

When an adaptive cruise control (above-described ACC) system is operating as described above, it is difficult to determine by the throttle aperture θti whether the driver has no driving intent. In this case, the determination of whether the driver has no driving intent is made with the aid the departure determination flag Fout. More specifically, when the throttle aperture θti cannot be detected (throttle aperture θti=0), the determination of whether the driver has no driving intent is made with the aid of the departure determination flag Fout. For example, when the departure determination flag Fout is ON, it is determined that the driver has no driving intent, and the driver state determination flag Fdrowsiness is set to ON (Fdrowsiness=ON).

The control method for departure avoidance is selected in the subsequent step S6. In the first embodiment, the control content for departure avoidance is decided based on the first obstacle-containing direction Sout obtained in step S3, the departure direction Dout obtained in step S4, and the departure determination flag Fout obtained in step S5. In the fifth embodiment, the control content for departure avoidance is decided with reference to the driver state determination flag Fdrowsiness obtained in step S61 or step S5 in addition to the above information.

For example, when the driver state determination flag Fdrowsiness is ON and the departure determination flag Fout is ON (Tout<Ts), a departure alarm is executed. When the driver state determination flag Fdrowsiness is ON and the departure determination flag Fout is ON (Tout<Ts), the braking control method for departure avoidance is selected based on the first obstacle-containing direction Sout and the departure direction Dout.

There are cases in which the driver has set the system operation switch 37 to an OFF position. This is a case in which the driver has determined that the system is not required, for example, and has set the system operation switch 37 to the OFF position. In this case as well, when the driver state determination flag Fdrowsiness is ON and the departure determination flag Fout is ON (Tout<Ts), the system is configured to perform the departure-avoiding braking control.

Next, the target yaw moment generated in the host vehicle is calculated in step S7 in the same manner as in the above-described first embodiment, and the departure-avoiding deceleration is calculated in step S8.

The target brake hydraulic pressure for each wheel is calculated in the subsequent step S9. In other words, the final brake hydraulic pressure is calculated based on the presence or absence of the departure-avoiding braking control. Here, the final brake hydraulic pressure is calculated as follows based on the driver state determination flag Fdrowsiness in accordance with the processing in step S6.

(1) The target brake hydraulic pressure Psi (i=fl, fr, rl, rr) for each wheel is set to the master cylinder hydraulic pressure Pmf and Pmr based on Equations (5) and (6) when the departure determination flag Fout is OFF (Fout=OFF). In other words, either a determination result indicating that departure will not occur has been obtained, or when the departure determination flag Fout is ON but the driver state determination flag Fdrowsiness is OFF.

(2) When the driver state determination flag Fdrowsiness is ON and the departure determination flag Fout is ON (Fout=ON). In other words, when a determination result indicating that departure will occur has been obtained, the target brake hydraulic pressure difference ΔPsf of the front wheels and the target brake hydraulic pressure difference ΔPsr of the rear wheels are calculated based on Equations (7) to (10). The final target brake hydraulic pressure Psi (i=fl, fr, rl, rr) for each wheel is calculated using the calculated target brake hydraulic pressure differences ΔPsf and ΔPsr, and also using the target brake hydraulic pressures Pgf and Pgr for deceleration. More specifically, the final target brake hydraulic pressure Psi (i=fl, fr, rl, rr) for each wheel is calculated based on the braking control method selected in step S6.

In the fifth embodiment, when the driver drowsiness state determination flag Fdrowsiness is ON and the departure determination flag Fout is ON in step S6, the braking control method for departure avoidance is selected based on the first obstacle-containing direction Sout and the departure direction Dout. Because of this, the braking control method for the first to third cases is established in accordance with the state of first obstacle-containing direction Sout and the departure direction Dout when the driver state determination flag Fdrowsiness is ON and the departure determination flag Fout is ON.

In other words, when there is no match between the first obstacle-containing direction Sout and the departure direction Dout, the braking control such as that in the first case is performed. When there is a match between the first obstacle-containing direction Sout and the departure direction Dout, and the road type R obtained in step S3 is an ordinary road, the braking control such as that in the second case is performed. When there is a match between the first obstacle-containing direction Sout and the departure direction Dout, and the road type R obtained in step S3 is an expressway, the braking control such as that in the third case is performed.

The target brake hydraulic pressure Psi (i=fl, fr, rl, rr) for each wheel is calculated in step S9 in accordance with such braking control methods.

Described above is the computational processing of the brake driving force control unit 8. With the brake driving force control unit 8, the target brake hydraulic pressure Psi (i=fl, fr, rl, rr) for each wheel as calculated in step S9 is output to the brake hydraulic pressure control unit 7 as a brake hydraulic pressure command value.

Next, the effects of the fifth embodiment are described.

As described above, when the driver drowsiness state determination flag Fdrowsiness is ON; that is, when the driver has no driving intent, the departure-avoiding braking control is performed in accordance with the departure tendency when there is a lane departure tendency. Unnecessary operation of the departure-avoiding braking control is eliminated and departure can be appropriately prevented.

As described above, when a positive determination result that there is no driving intent by the driver is obtained a predetermined number of times, determining whether there is a driving intent on the part of the driver is made easier by changing the predetermined threshold for determining that there is no driving intent on the part of the driver. Departure can be prevented by making it easier to determine that there is no driving intent on the part of the driver.

Also, as described above, the departure-avoiding braking control is performed when there is a lane departure tendency, even when the system-operating switch 37 is set to the OFF position. Departure can thereby be prevented. Furthermore, having fallen asleep while driving, the driver often does not realize that that he himself has turned the system-operating switch 37 to the OFF position. Hence, it is more effective to perform departure-avoiding braking control when the driver has no driving intent, even when the system-operating switch 37 is set to the OFF position.

The embodiments of the present invention have been described above. However, the present invention is not limited to being realized in the above-described embodiments. In other words, a detailed description was given in the above embodiments concerning the methods of combining braking control (departure-avoiding yaw control) so that yaw moment for avoiding departure is imparted to the host vehicle, and deceleration control (departure-avoiding deceleration control) for decelerating to avoiding departure; the operating order of these methods, and the control amounts used in these methods (magnitude of the yaw moment, and magnitude of the deceleration). However, it is apparent that the present invention is not limited thereby.

The above embodiments were described with reference to a case in which the deceleration of the host vehicle by departure-avoiding deceleration control was set based on the driving environment. However, the control amount (yaw moment) of the departure-avoiding yaw control can also be set in the same manner based on the driving environment. In this case, when the control method of step S6 is selected, for example, the control amount thereof can also be decided at the same time.

Also, the estimated time to departure Tout was calculated (refer to Equation (2)) in the above-described embodiments based on the lateral displacement X and the variation dx thereof. However, the estimated time to departure Tout can also be obtained by another method. For example, the estimated time to departure Tout may also be obtained based on the yaw angle $\phi$, yaw rate $\phi'$, or steering angle $\delta$.

Also, in the embodiments described above, the intention of the driver to change lanes is obtained based on the steering angle $\alpha$ and the variation of the steering angle (refer to step S5). However, the intention of the driver to change lanes can also be obtained by another method. For example, the intention of the driver to change lanes can be obtained based on the steering torque.

Also, the target yaw moment Ms was calculated (refer to Equation (3)) in the above-described embodiments based on lateral displacement X and the variation dx. However, the target yaw moment Ms can also be obtained by another method. For example, the target yaw moment Ms can also be obtained based on the yaw angle $\phi$, lateral displacement X, and driving lane curvature $\beta$, as shown in Equation (17) below.

$$Ms = K3 \cdot \phi + K4 \cdot X + K5 \cdot \beta \tag{17}$$

Here, terms K3, K4, and K5 are gains that vary with velocity V.

Also, the target brake hydraulic pressure Pgf for the front wheels in the above embodiments was described with the aid of a specific equation (refer to Equation (4)). However, the present invention is not limited thereby. The target brake hydraulic pressure Pgf for the front wheels can also be calculated with Equation (18) below.

$$Pgf = Kgv \cdot V + Kg\phi \cdot \phi + Kg\beta \cdot \beta \tag{18}$$

Here, terms Kg$\phi$ and Kg$\beta$ are, respectively, conversion factors that are used for converting braking force to brake hydraulic pressure and are set based on the yaw angle $\phi$ and driving lane curvature $\beta$.

The target hydraulic pressure differences $\Delta Psf$ and $\Delta Psr$ for the front and rear wheels are calculated in order to realize departure-avoiding yaw control in the embodiments described above (refer to Equations (7) and (8)). However, the present invention is not limited thereby. For example, the departure-avoiding yaw control can be realized solely with front wheel target hydraulic pressure difference $\Delta Psf$. In this case, the front wheel target hydraulic pressure difference $\Delta Psf$ is calculated with Equation (19) below.

$$\Delta Psf = 2 \cdot Kbf \cdot Ms / T \tag{19}$$

The brake structure described in the embodiments above is one in which hydraulic pressure is used. It apparent, however, that the present invention is not limited thereby. It is also possible, for example, to use electric powered friction brakes that press a friction material to the rotor of a wheel side member by an electric actuator, or regenerative brakes or dynamic brakes that electrically cause braking action. Other options include engine brakes that provide braking control by changing the valve timing or the like of the engine, gear brakes that operate as engine brakes by changing the gear ratio, or air brakes.

In the embodiments described above, the determination as to whether the driver has no driving intent is made based on the throttle aperture $\theta ti$ and the departure determination flag Fout (steering angle δ, the variation Δδ thereof, and the like). It is apparent, however, that the present invention is not limited thereby. For example, the determination that the driver has no driving intent can also be made with another device or method. For example, in the fifth embodiment described above, the state in which the driver has no driving intent is detected based on the throttle aperture θti. A driving state in which the driver is asleep is an example of the state in which the driver has no driving intent. However, the state in which the driver is looking elsewhere and lacking attention can also be a state in which the driver has no driving intent.

As described above, when an adaptive cruise control (above-described ACC) system is operating, it cannot be detected whether the driver is operating the accelerator, so it is difficult to determine by the throttle aperture θti whether the driver has no driving intent. In this case, determination may be made from the state of the steering operation or the intention of the driver to change lanes. It can be concluded, for example, that the driver has no driving intent if there is no intention to change lanes and there is no steering operation taking place while the adaptive cruise control (above-described ACC) system is operating. Here, the term "no steering" refers to cases in which the steering angle is equal to or less than a predetermined angle, or cases in which the steering angle variation is equal to or less than a predetermined amount.

Thus, situations in which there is no intention to change lanes and there is no steering operation taking place while the adaptive cruise control (above-described ACC) system is operating can be taken as the absence of driving intent on the part of the driver, and departure can be optimally prevented in this case by performing departure-avoiding braking control in accordance with the departure tendency.

Also, canceling departure-avoiding braking control can be considered when the driver has operated the brakes or steered abruptly, for example. However, it is also possible to adopt an arrangement in which, when predetermined conditions are satisfied, it is assumed that the driver has no driving intent, and operation of the braking control is maintained without canceling departure-avoiding braking control even when the driver has operated the brakes or steered abruptly. For example, when a so-called brake assist system with a preview function operated by a forward monitoring laser and used in adaptive cruise control (above-described ACC) determines that there is no need for a brake operation or abrupt steering based on the host vehicle velocity, the relative velocity, or the distance to an obstacles or a vehicle in front, it is assumed that the driver has no driving intent, and operation of the braking control is maintained without canceling departure-avoiding braking control if the driver has operated the brakes or steered abruptly.

As used herein, the term "brake assist system with a preview function" refers to a system whereby the vehicular distance to a vehicle in front is adjusted by automatically controlling the host vehicle velocity, and an alarm or controlled deceleration is engaged to prevent contact with the host vehicle in front when there is a possibility of coming excessively close.

In the description of the above-described embodiments, the processing (steps S1 and S3) in the imaging unit 13, the navigation device 15, the ACC radar 31, the rear lateral obstacle monitoring radars 32 and 33, the lateral obstacle monitoring radars 34 and 35, the rear obstacle monitoring radar 36, and the brake driving force control unit 8 constitute a driving environment detection section running condition determining section or means for detecting the driving environment of the host vehicle. The processing of step S4 of the brake driving force control unit 8 constitutes departure tendency detection section or means for detecting the departure tendency of the host vehicle from the driving lane. The processing of step S6 of the brake driving force control unit 8 constitutes a setting section or means for setting the yaw moment contribution and the deceleration contribution based on the driving environment detected by the driving environment detection section running condition determining section or means and the departure tendency detected by the departure tendency detection section or means. The processing of step S7 of the brake driving force control unit 8 constitutes a target yaw moment calculation section or means for calculating the target yaw moment in order to avoid departure from the driving lane of the host vehicle based on the yaw moment contribution that has been set by the setting section or means. The processing of step S8 of the brake driving force control unit 8 and the processing shown in FIG. 10 constitutes a deceleration control amount calculation section or means for calculating the deceleration control amount based on the deceleration contribution that has been set by the setting section or means. The processing of step S9 of the brake driving force control unit 8 constitutes a braking force control section or means for controlling the braking force of each wheel based on the target yaw moment calculated by the target yaw moment calculation section or means and the deceleration control amount calculated by the deceleration control amount calculation section or means when the departure tendency detection device detects a departure tendency. The processing of FIG. 10 of the brake driving force control unit 8 constitutes a timing setting section or means for setting the predetermined timing based on results obtained by comparing the host vehicle velocity and the first threshold, and results obtained by comparing the departure tendency and the second threshold.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Also the term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-193013, 2003-335754 and 2003-390505. The entire disclosure of Japanese Patent Application Nos. 2003-193013, 2003-335754 and 2003-390505 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lane departure prevention apparatus for a host vehicle comprising:
    a lane departure tendency determining section configured to determine a lane departure tendency indicative of a tendency of the host vehicle to depart from a driving lane;
    a running condition determining section configured to determine a driving environment of the host vehicle;
    a braking force control section configured to control a braking force in response to determinations by the lane departure tendency determining section and the running condition determining section to selectively produce a yaw moment on the host vehicle in accordance with the lane departure tendency of the host vehicle to avoid departure of the host vehicle from the driving lane, and a deceleration on the host vehicle in accordance with the driving environment of the host vehicle;
    a setting section configured to set a yaw moment contribution and a deceleration contribution based on the lane departure tendency detected by the lane departure tendency determining section and a direction information indicating at least one of right and left directions in which a level of risk is high with respect to the driving lane, the direction information being determined based on the driving environment that is determined by the running condition determining section;
    a target yaw moment calculation section configured to calculate a target yaw moment to selectively avoid departure from the driving lane of the host vehicle based on the yaw moment contribution that has been set by the setting section; and
    a deceleration control amount calculation section configured to calculate a deceleration control amount based on the deceleration contribution that has been set by the setting section,
    the braking force control section being further configured to selectively control the braking force based on the target yaw moment calculated by the target yaw moment calculation section and the deceleration control amount calculated by the deceleration control amount calculation section, when the lane departure tendency is determined by the lane departure tendency determining section.

2. The lane departure prevention apparatus according to claim 1, wherein
    the braking force control section is configured to create a difference in a generation timing of the braking force used to produce the target yaw moment, based on the driving environment detected by the running condition determining section, such that the generation timing of the braking force is based on the deceleration control amount.

3. The lane departure prevention apparatus according claim 1, wherein
    the braking force control section is configured to generate the braking force based on the target yaw moment, and then generate the braking force based on the deceleration control amount, when the running condition determining section has detected an obstacle in a departure direction of the host vehicle.

4. The lane departure prevention apparatus according to claim 1, wherein
    the braking force control section is configured to generate the braking force based on the target yaw moment, and then generate the braking force based on the deceleration control amount, when the running condition determining section has determined that the host vehicle will depart from the driving lane in at least one direction of a road shoulder or an opposing lane.

5. The lane departure prevention apparatus according to claim 1, wherein
    the braking force control section is configured to generate the braking force based on the target yaw moment, and then generate the braking force based on the deceleration control amount, when the running condition determining section has detected the host vehicle is traveling is a two-lane, two-way road.

6. The lane departure prevention apparatus according to claim 1, further comprising
    a timing setting section configured to set a predetermined timing based on the driving environment detected by the running condition determining section,
    the braking force control section being further configured to generate the braking force with the predetermined timing when the lane departure tendency is determined by the lane departure tendency determining section.

7. The lane departure prevention apparatus according to claim 6, wherein
    the timing setting section is configured to advance the predetermined timing that generates the braking force, when the running condition determining section has detected an obstacle in a direction that indicates the departure tendency determined by the lane departure tendency determining section.

8. The lane departure prevention apparatus according to claim 7, wherein
    the running condition determining section is configured to determine if the obstacle is another vehicle other than the host vehicle, when the timing setting section advances the predetermined timing that generates the braking force.

9. The lane departure prevention apparatus according to claim 6, wherein
    the timing setting section is configured to advance the predetermined timing that generates the braking force, when a time interval until the host vehicle departs to the driving lane side of another vehicle is shorter than a time interval until another vehicle traveling laterally behind the host vehicle reaches a lateral side of the host vehicle.

10. The lane departure prevention apparatus according to claim 1, wherein
    the setting section is configured to adjust the deceleration control amount to a smaller value when the running condition determining section has detected an adjacent vehicle behind the host vehicle.

11. The lane departure prevention apparatus according to claim 10, wherein
    the setting section is configured to set the deceleration control amount to a smaller value with a decrease in the value obtained by dividing a relative speed difference between the adjacent vehicle and the host vehicle by the velocity of the host vehicle.

12. The lane departure prevention apparatus according to claim 1, wherein
    the braking force control section is configured to report a driving condition of the host vehicle by controlling the braking force when the running condition determining section has detected that the host vehicle is driving on a lane marker.

13. The lane departure prevention apparatus according to claim 1, wherein
the lane departure tendency determining section is configured to estimate a time until the host vehicle departs the driving lane and determine that the host vehicle has a departure tendency when the estimated time is less than a predetermined time.

14. The lane departure prevention apparatus according to claim 1, wherein
the braking force control section is configured to control the braking force by detecting conditions indicating whether a driver intention exists to change lanes.

15. The lane departure prevention apparatus according to claim 14, wherein
the braking force control section is further configured to determine if the driver intention exists to change lanes by using a predetermined threshold and to change the predetermined threshold when the braking force control section determines that the driver intention does not exist.

16. The lane departure prevention apparatus according to claim 14, wherein
the braking force control section is further configured to determine that the driver intention does not exist based on whether a throttle aperture has continuously fluctuated at or below a predetermined level for a predetermined time.

17. The lane departure prevention apparatus according to claim 14, wherein
the braking force control section is further configured to determine that the driver intention does not exist based on whether an automatic cruise control is operating, there is no driver indication to change lanes, and no steering operation is performed.

18. The lane departure prevention apparatus according to claim 1, wherein
the braking force control section is configured to apply the braking force such that priority is given to decelerate the host vehicle over producing the yaw moment when at least one of a host vehicle velocity is greater than a first threshold or the lane departure tendency is greater than a second threshold.

19. The lane departure prevention apparatus according to claim 1, wherein
the braking force control section is configured to apply the braking force such that priority is given to decelerate the host vehicle over producing the yaw moment when at least one of a host vehicle velocity is determined to be greater than a first threshold or a lane departure time is determined to be greater than a second threshold.

20. The lane departure prevention apparatus according to claim 19, wherein
the braking force control section is configured to generate the braking force such that priority is given to decelerate the host vehicle over imparting the yaw moment when both the vehicle velocity is determined to be greater than a first threshold and the lane departure time is determined to be greater than the second threshold.

21. The lane departure prevention apparatus according to claim 19, wherein
the braking force control section is configured to generate the braking force such that deceleration is performed prior to imparting the yaw moment.

22. The lane departure prevention apparatus according to claim 19, wherein
the first threshold is a limit velocity substantially corresponding to a vehicle behavior in which the host vehicle is stable when the yaw moment has been imparted.

23. A lane departure prevention apparatus for a host vehicle comprising:
a lane departure tendency determining section configured to determine a lane departure tendency indicative of a tendency of the host vehicle to depart from a driving lane;
a running condition determining section configured to determine a running condition of the host vehicle;
a braking force control section configured to control a braking force in response to determinations by the lane departure tendency determining section and the running condition determining section to selectively produce at least one of a yaw moment on the host vehicle in accordance with the lane departure tendency of the host vehicle to avoid departure of the host vehicle from the driving lane, and a deceleration on the host vehicle in accordance with the running condition of the host vehicle, the braking force control section further configured to control the braking force by detecting conditions indicating whether a driver intention exists to change lanes; and
a departure avoidance ON/OFF operating section configured to allow the driver to selectively switch the braking control operation for avoiding departure to an ON position and an OFF position,
the braking force control section being further configured to override the departure avoidance ON/OFF operating section when at least one predetermined condition exists, even when the departure avoidance ON/OFF operating section has been switched to the OFF position.

24. A lane departure prevention apparatus for a host vehicle comprising:
a lane departure tendency determining section configured to determine a lane departure tendency indicative of a tendency of the host vehicle to depart from a driving lane;
a running condition determining section configured to determine a running condition of the host vehicle; and
a braking force control section configured to control a braking force in response to determinations by the lane departure tendency determining section and the running condition determining section to selectively produce at least one of a yaw moment on the host vehicle in accordance with the lane departure tendency of the host vehicle to avoid departure of the host vehicle from the driving lane, and a deceleration on the host vehicle in accordance with the running condition of the host vehicle, the braking force control section further configured to control the braking force by detecting conditions indicating whether a driver intention exists to change lanes,
the braking force control section being further configured to determine that the driver intention does not exist based on whether the driver having performed a driving operation when no need exists for the driver to perform the driving operation in view of a state of forward objects and a state of the host vehicle.

25. A lane departure prevention apparatus for a host vehicle comprising:
a lane departure tendency determining section configured to determine a lane departure tendency indicative of a tendency of the host vehicle to depart from a driving lane;

a running condition determining section configured to determine a driving environment of the host vehicle;

a braking force control section configured to control a braking force in response to determinations by the lane departure tendency determining section and the running condition determining section to selectively produce a yaw moment on the host vehicle in accordance with the lane departure tendency of the host vehicle to avoid departure of the host vehicle from the driving lane, and a deceleration on the host vehicle in accordance with the driving environment of the host vehicle;

a vehicle velocity determining section configured to determine a host vehicle velocity;

a setting section configured to set a yaw moment contribution and a deceleration contribution based on the lane departure tendency detected by the lane departure tendency determining section and the host vehicle velocity determined by the vehicle velocity determining section;

a target yaw moment calculation section configured to calculate a target yaw moment to selectively avoid departure from the driving lane of the host vehicle based on the yaw moment contribution that has been set by the setting section;

a deceleration control amount calculation section configured to calculate a deceleration control amount based on the deceleration contribution that has been set by the setting section; and a timing setting section configured to set the predetermined timing based on the comparison result of magnitudes of the host vehicle velocity and the first threshold, and the comparison result of magnitudes of the lane departure tendency and the second threshold, the braking force control section being configured to apply the braking force such that priority is given to decelerate the host vehicle over producing the yaw moment when at least one of a host vehicle velocity is determined to be greater than a first threshold or a lane departure time is determined to be greater than a second threshold, and the braking force control section being further configured to control the braking force based on the target yaw moment calculated by the target yaw moment calculation section and the deceleration control amount calculated by the deceleration control amount calculation section with a predetermined timing, when the lane departure tendency determining section detects the lane departure tendency.

26. A lane departure prevention apparatus for a host vehicle comprising:

lane departure tendency determining means for determining a lane departure tendency indicative of a tendency of the host vehicle to depart from a driving lane;

running condition determining means for determining a driving environment of the host vehicle;

braking force control means for controlling a braking force in response to determinations by the lane departure tendency determining means and the running condition determining means to selectively produce a yaw moment on the host vehicle in accordance with the lane departure tendency of the host vehicle to avoid departure of the host vehicle from the driving lane, and a deceleration on the host vehicle in accordance with the driving environment of the host vehicle;

setting means for setting a yaw moment contribution and a deceleration contribution based on the lane departure tendency detected by the lane departure tendency determining means and a direction information indicating at least one of right and left directions in which a level of risk is high with respect to the driving lane, the direction information being determined based on the driving environment that is determined by the running condition determining means;

target yaw moment calculation means for calculating a target yaw moment to selectively avoid departure from the driving lane of the host vehicle based on the yaw moment contribution that has been set by the setting means; and deceleration control amount calculation means for calculating a deceleration control amount based on the deceleration contribution that has been set by the setting means, the braking force control means further selectively controlling the braking force based on the target yaw moment calculated by the target yaw moment calculation means and the deceleration control amount calculated by the deceleration control amount calculation means, when the lane departure tendency is determined by the lane departure tendency determining means.

27. A method of preventing lane departure of a host vehicle comprising:

determining a lane departure tendency indicative of a tendency of the host vehicle to depart from a driving lane;

determining a driving environment of the host vehicle;

controlling a braking force in response to determinations of the lane departure tendency and the driving environment to selectively produce a yaw moment on the host vehicle in accordance with the lane departure tendency of the host vehicle to avoid departure of the host vehicle from the driving lane, and a deceleration on the host vehicle in accordance with the driving environment of the host vehicle;

setting a yaw moment contribution and a deceleration contribution based on the lane departure tendency and a direction information indicating at least one of right and left directions in which a level of risk is high with respect to the driving lane, the direction information being determined based on the driving environment;

calculating a target yaw moment to selectively avoid departure from the driving lane of the host vehicle based on the yaw moment contribution; and calculating a deceleration control amount based on the deceleration contribution, the controlling the braking force further including selectively controlling the braking force based on the target yaw moment and the deceleration control amount upon determining the lane departure tendency.

* * * * *